(12) United States Patent
Xiong

(10) Patent No.: US 10,127,700 B2
(45) Date of Patent: Nov. 13, 2018

(54) GENERATION OF DISPLAY OVERLAY PARAMETERS UTILIZING TOUCH INPUTS

(71) Applicant: SAMSUNG DISPLAY CO., LTD., Yongin, Gyeonggi-Do (KR)

(72) Inventor: Wei Xiong, Mountain View, CA (US)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 14/663,396

(22) Filed: Mar. 19, 2015

(65) Prior Publication Data

US 2015/0279074 A1    Oct. 1, 2015

Related U.S. Application Data

(60) Provisional application No. 61/973,152, filed on Mar. 31, 2014.

(51) Int. Cl.
| | |
|---|---|
| *G09G 5/00* | (2006.01) |
| *G06T 11/60* | (2006.01) |
| *G06F 3/041* | (2006.01) |
| *G06K 9/46* | (2006.01) |
| *G09G 5/18* | (2006.01) |
| *G06T 11/00* | (2006.01) |
| *G06F 3/0488* | (2013.01) |
| *G06T 7/90* | (2017.01) |

(52) U.S. Cl.
CPC ............ *G06T 11/60* (2013.01); *G06F 3/0418* (2013.01); *G06F 3/04883* (2013.01); *G06K 9/4652* (2013.01); *G06T 7/90* (2017.01); *G06T 11/001* (2013.01); *G09G 5/18* (2013.01)

(58) Field of Classification Search
CPC ................. G09T 5/14; G09G 2340/10; G09G 2340/125; G06T 11/60; G06T 15/503
USPC ........................................................ 345/629
See application file for complete search history.

(56) References Cited

U.S. PATENT DOCUMENTS

| | | | |
|---|---|---|---|
| 8,014,596 B2 * | 9/2011 | Campbell | .......... H04N 1/40062 382/162 |
| 2002/0051155 A1 | 5/2002 | Fujioka et al. | |

(Continued)

FOREIGN PATENT DOCUMENTS

| | | |
|---|---|---|
| CN | 102023760 A | 4/2011 |
| GB | 2 415 519 A | 12/2005 |

(Continued)

OTHER PUBLICATIONS

"Video Object Cut and Paste" (Yin Li, Jian Sun, Heung-Yeung Shum, Microsoft Research Asia, in Oct. 2011).*

(Continued)

*Primary Examiner* — Gordon G Liu
(74) *Attorney, Agent, or Firm* — Lewis Roca Rothgerber Christie LLP

(57) ABSTRACT

A system includes: a first module configured to receive a video image and to record image sections of the video image corresponding to touch event locations; a second module configured to determine foreground color information and background color information of each image section based on a comparison of the image sections of the video image; and a third module configured to output overlay information based on the foreground color information and the background color information.

19 Claims, 14 Drawing Sheets

(56) References Cited

U.S. PATENT DOCUMENTS

| | | | |
|---|---|---|---|
| 2005/0053278 A1 | 3/2005 | Li | |
| 2007/0206024 A1 | 9/2007 | Rao | |
| 2009/0044117 A1* | 2/2009 | Vaughan | G11B 27/034 |
| | | | 715/716 |
| 2010/0277429 A1* | 11/2010 | Day | G06F 3/0416 |
| | | | 345/173 |
| 2016/0065864 A1* | 3/2016 | Guissin | G06T 5/008 |
| | | | 348/239 |

FOREIGN PATENT DOCUMENTS

| | | |
|---|---|---|
| KR | 10-0933042 | 12/2009 |
| KR | 10-1203701 | 11/2012 |
| KR | 10-2013-0098836 A | 9/2013 |

OTHER PUBLICATIONS

Korean Patent Abstract No. 10-2009-0002537 A, dated Jan. 9, 2009 corresponds to KR Registration No. 10-0933042, dated Dec. 21, 2009 above.

Korean Patent Abstract No. 10-2011-0050356 A, dated May 13, 2011 corresponds to KR Registration No. 10-1203701 dated Nov. 21, 2012 above.

EPO Search Report dated Aug. 25, 2015, for corresponding European Patent application 15160702.5, (8 pages).

CN Office action issued in corresponding application No. CN201510147965.8 dated Sep. 30, 2018, 9 pages.

\* cited by examiner

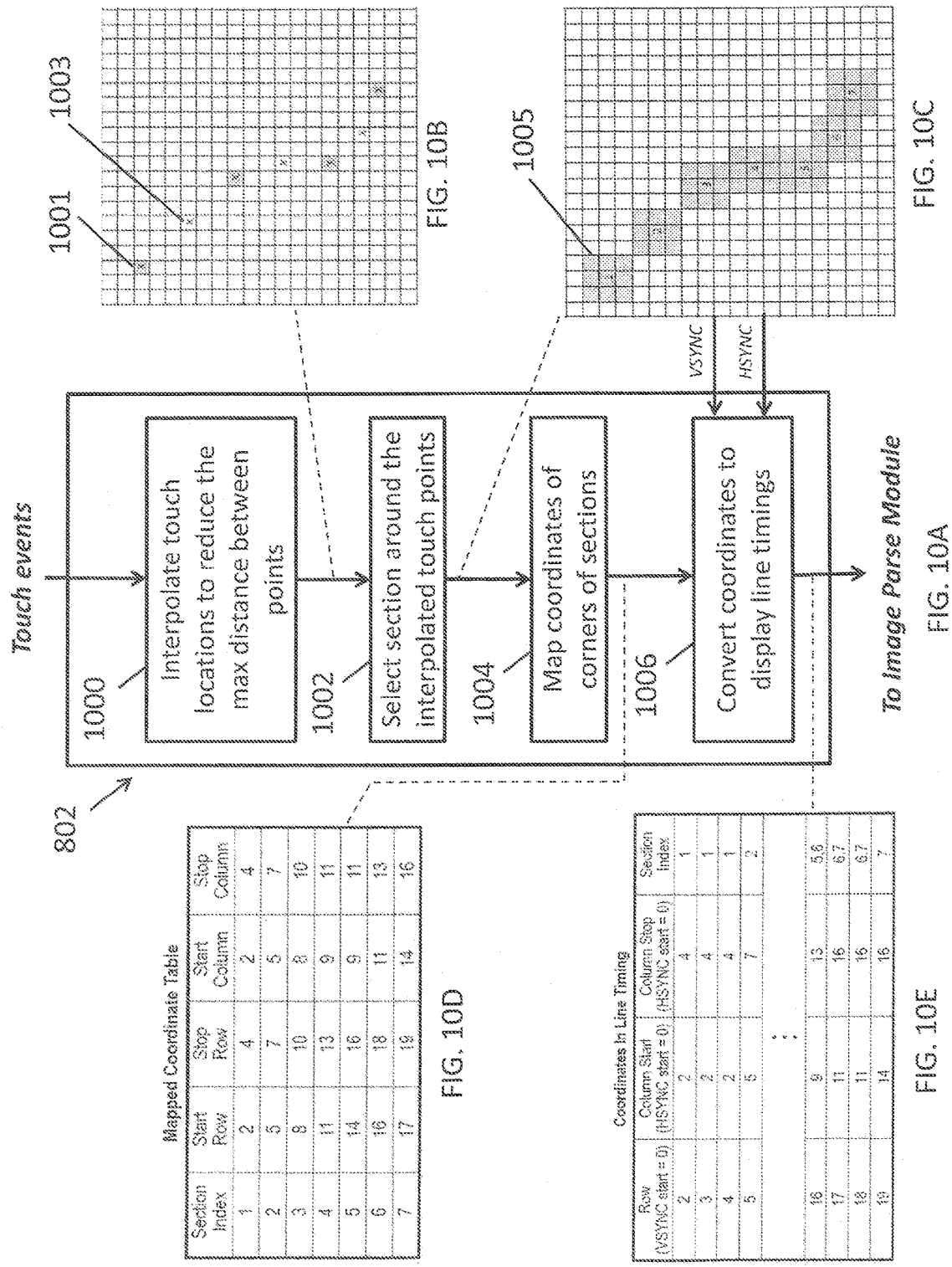

GENERATION OF DISPLAY OVERLAY PARAMETERS UTILIZING TOUCH INPUTS

CROSS-REFERENCE TO RELATED APPLICATION(S)

This patent application claims the priority to and the benefit of U.S. Provisional Application Ser. No. 61/973,152, filed Mar. 31, 2014, titled "Generation of Display Overlay Parameters Utilizing Touch Inputs," the entire content of which is incorporated herein by reference.

BACKGROUND

1. Field

Embodiments of the present invention relate to display devices with touch input devices and, more specifically, systems and methods for reducing display lag between the touch input device and the display device.

2. Related Art

Display panels incorporating or coupled to overlaid touch sensor panels provide an interaction system for touch-enabled computing devices such as mobile phones, tablet computers, laptop computers, and desktop computers. In such computing devices, graphics are displayed on the display panel and a user can interact with these devices by touching the screen (e.g., using an active stylus, a passive stylus, or a body part such as a finger), thereby providing an intuitive user interface.

Touch events detected by the touch sensor panels are typically processed by high level application software running on an application processor (AP) of the device. The many processing steps between the touch sensor panel and the AP and the non-deterministic processing time on the AP (including delays due to other computational tasks being performed by the AP) introduce high levels of latency (e.g., 70 to 150 milliseconds) that reduce responsiveness of the computing device to the user's touch inputs.

Some empirical studies have indicated that most humans can detect even a 30 millisecond asynchrony between senses, such as touch and vision (see, e.g., Keetels, M. and Vroomen, J. (2012). Perception of Synchrony Between the Senses. In M. M. Murray and M. T. Wallace (Eds.), Frontiers in the neural basis of multisensory processes (pp. 147-177). London: Taylor & Francis Group). Delays of 50 to 150 milliseconds would be detectable to most of users of these computing devices, which could lead to increased user frustration due to the failure of the computing device to immediately provide feedback to the user's input.

SUMMARY

Aspects of embodiments of the present invention are directed to reducing the latency between a touch event and the display response to this touch event. According to an aspect of embodiments of the present invention, the latency can be reduced by reducing the need for close integration between components of the touch input device.

Additionally, aspects of embodiments of the present invention are directed to detecting locations of a moving line in a video image, the line corresponding to a continuous sequence of touch events; determining characteristics of the moving line, such as color and width; and generating overlay parameters from the determined characteristics. According to an embodiment, the overlay parameters are used to reduce the apparent display latency.

According to embodiments of the present invention, a system includes: a first module configured to receive a video image and to record image sections of the video image corresponding to touch event locations; a second module configured to determine foreground color information and background color information of each image section based on a comparison of the image sections of the video image; and a third module configured to output overlay information based on the foreground color information and the background color information.

The video image may include a foreground color and a background color, the foreground color corresponding to a displayed line.

The foreground color information may include a foreground color of the video image and a foreground uniformity factor that is a percentage of the image section containing the foreground color, and the background color information may include a background color of the video image and a background uniformity factor that is a percentage of the image section containing the background color.

The overlay information may include a color of an overlay, and the third module may be further configured to disable an overlay or to output the foreground color of the image section as the color of the overlay, based on a comparison of the foreground uniformity factor and a foreground threshold value.

The third module may be further configured to disable an overlay or to determine a boundary for the overlay, based on a comparison of the background uniformity factor and a background threshold value.

The boundary for the overlay may be determined by comparing the background color of a first image section and the background color of a second image section.

The third module may be further configured to output coordinates corresponding to the first image section when the background color of the first image section is different from the background color of the second image section.

The overlay information may include dimensions of an overlay, and the third module may be further configured to determine a width of a line of the overlay based on the foreground uniformity factor for each image section.

The second module may further be configured to bias each image section toward containing more foreground color or more background color, by applying a weighting factor to each image section.

The first, second, and third modules may be components of a display driver interface controller, the display driver interface controller being configured to receive the video image from an application processor and to output the overlay information to a display panel.

According to another embodiment of the present invention, a method for generating a display overlay includes: receiving a plurality of touch events and a video image; recording image sections of the video image corresponding to locations of the touch events; comparing the recorded image sections with one another to determine foreground color information and background color information of each image section; and supplying overlay information based on the foreground color information and the background color information.

The video image may include a foreground color and a background color, the foreground color corresponding to a displayed line.

The foreground color information may include a foreground color of the video image and a foreground uniformity factor that is a percentage of the image section containing the foreground color, and the background color information may include a background color of the video image and a background uniformity factor that is a percentage of the image section containing the background color.

The overlay information may include a color of the overlay, and the method may further include: comparing the foreground uniformity factor and a foreground threshold value; and disabling an overlay or supplying the foreground color of the image section as the color of the overlay, based on the comparison.

The method may further include: comparing the background uniformity factor and a background threshold value; and disabling an overlay or determining a boundary for the overlay, based on the comparison.

The determining the boundary for the overlay may include comparing the background color of a first image section and the background color of a second image section.

The method may further include: supplying coordinates corresponding to the first image section when the background color of the first image section is different from the background color of the second image section.

The overlay information may include dimensions of the overlay, and the method may further include: determining a width of a line of the overlay based on the foreground uniformity factor for each image section.

The method may further include: applying a weighting factor to each image section to bias each image section toward containing more foreground color or more background color.

An image section that is earlier in time may be biased toward containing more foreground color and an image section that is later in time may be biased toward containing more background color.

BRIEF DESCRIPTION OF THE DRAWINGS

The accompanying drawings, together with the specification, illustrate example embodiments of the present invention, and, together with the description, serve to explain the principles of the present invention.

FIG. 10A is a flowchart illustrating a process of a selection module of a detection system according to one embodiment of the present invention. FIG. 10B is a schematic illustration of interpolated touch points according to one embodiment of the present invention. FIG. 10C is a schematic illustration of selected video images sections according to one embodiment of the present invention. FIG. 10D is a table of mapped coordinates according to one embodiment of the present invention. FIG. 10E is a table of coordinates in line timing according to one embodiment of the present invention.

DETAILED DESCRIPTION

Figure 1A:
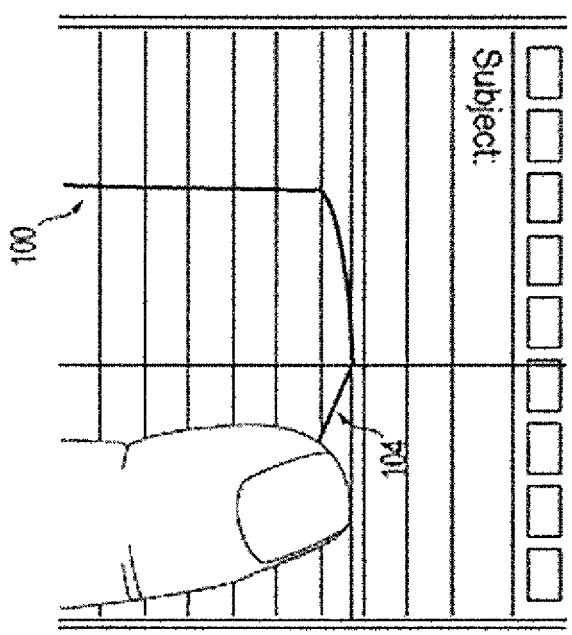
FIG. 1A illustrates the response of a device including a conventional touch input processing device.

In the following detailed description, only certain example embodiments of the present invention are shown and described, by way of illustration. As those skilled in the art would recognize, the invention may be embodied in many different forms and should not be construed as being limited to the embodiments set forth herein. When an element is referred to as being "connected to" or "coupled to" another element, it can be directly connected to the another element or be indirectly connected to the another element with one or more intervening elements interposed therebetween. Like reference numerals designate like elements throughout the specification.

Embodiments of the present invention allow a user to perceive a faster touch response by displaying an image based on the touch locations in advance of the application processor rendered image.

Software designed for touch interfaces often utilize a metaphor of direct physical manipulation of pseudo "real-world" objects and/or the drawing of paths on the screen to provide visual feedback (e.g., for the trace of a finger on a swiping or gesture-based on-screen keyboard, for the trace of a path in a drawing or sketchbook application, and for a path drawn in a game).

A common complaint of mobile phones is the lag of the user interface (UI). Current mobile phones typically take 50 to 150 milliseconds to update the display in response to a touch action. For example, the typical display response time to a touch event as measured on a Samsung® Galaxy Note® 2 phone may be more than 100 milliseconds or roughly over 6 frames of video images, based on a refresh rate of 60 frames per second (FPS), which is noticeable by a large portion of users.

FIG. 1A illustrates the response of a device including a comparable touch input processing device, where the displayed line 100 has a gap 102 between the position of a finger and the last drawn portion of the displayed line 100, thereby causing noticeable display lag between the user's touch and the displayed line. Similar display lag is also typically encountered when using a stylus, whether active or passive.

Embodiments of the present invention allow the user to perceive a faster touch response by overlaying an image in the touch path in advance of the AP-rendered image. By closing the gap between the user's touch point (whether using a finger, stylus, or other implement) and the drawing of the line on the screen, the perceived display lag can be decreased. As used herein, the term "overlay" when used as a verb refers to combining video images (e.g., an AP-rendered image) and additional image data such that the additional image data replaces (or "overlays") some portion of the original video images. The term "overlay" when used as a noun may also refer to the appearance of that additional image data in the combined display image.

In addition, by using an overlay method, application software can also control the region (e.g., location on the display), color, and rendering operation of the displayed response to a touch event.

Figure 1B:
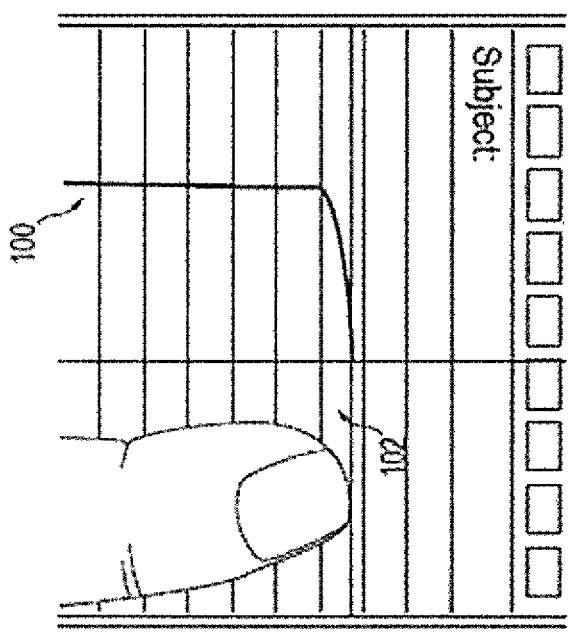
FIG. 1B illustrates the response of a device including a touch input processing device according to embodiments of the present invention.

FIG. 1B illustrates the displayed response of a device including a touch input processing device according to embodiments of the present invention, where the displayed line includes an estimated or computed portion 104 that is drawn by a low latency overlay system according to embodiments of the present invention, thereby reducing the display lag perceived by the user.

Figure 2:
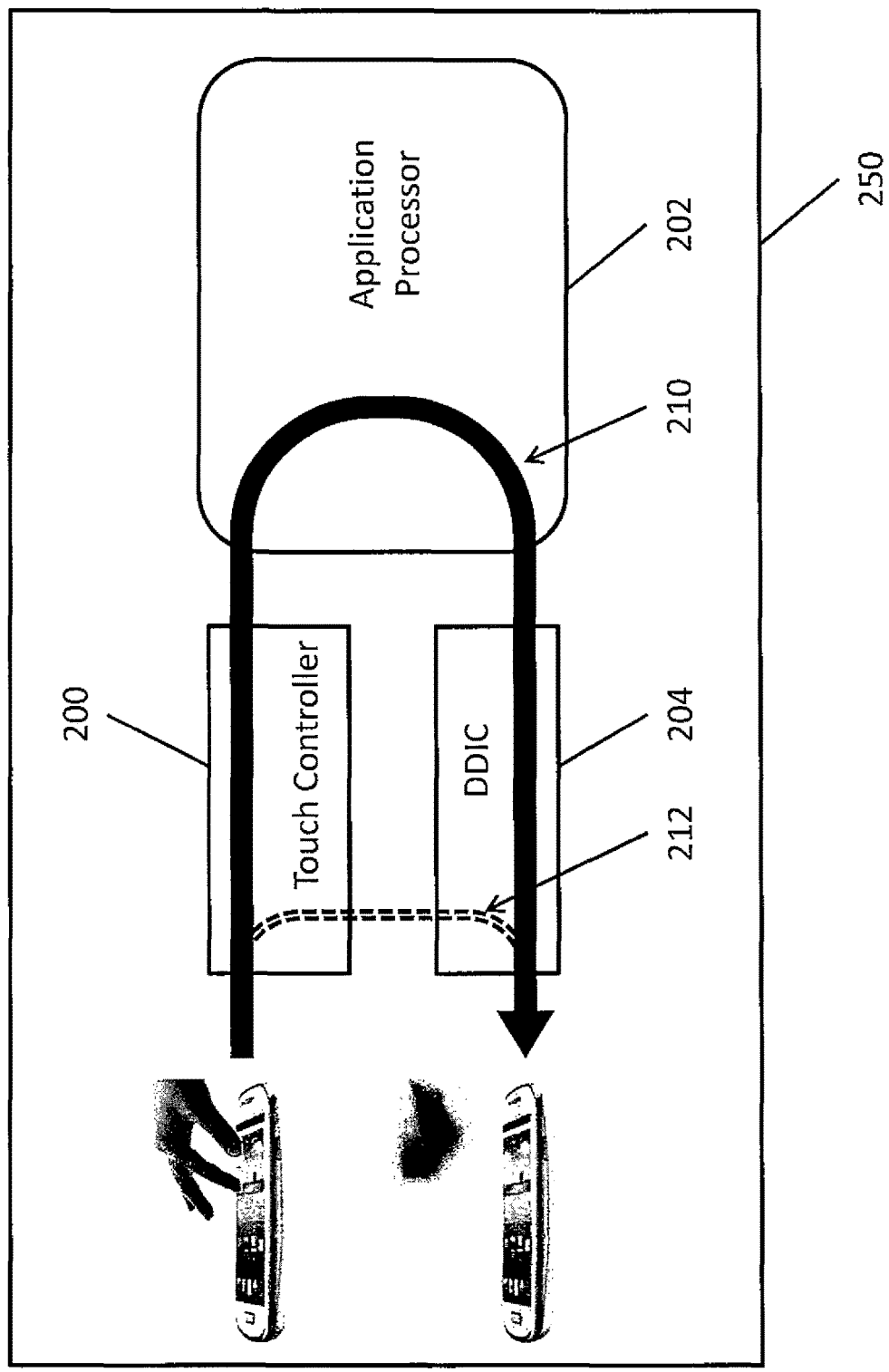
FIG. 2 is a schematic illustration of both a low latency feedback path and a conventional feedback path according to one aspect of embodiments of the present invention.

Referring to FIG. 2, in a computing device 250, as an alternative to comparable systems, embodiments of the present invention are directed to a low latency overlay system (which may be referred to as an "accelerator" or "visual feedback accelerator") that provides visual feedback immediately or more quickly over a low latency path 212 through a touch controller 200 and a display driver interface controller (DDIC) 204, followed by visual images at conventional levels of latency over a conventional latency path 210 through an application processor (AP) 202.

Figure 3:
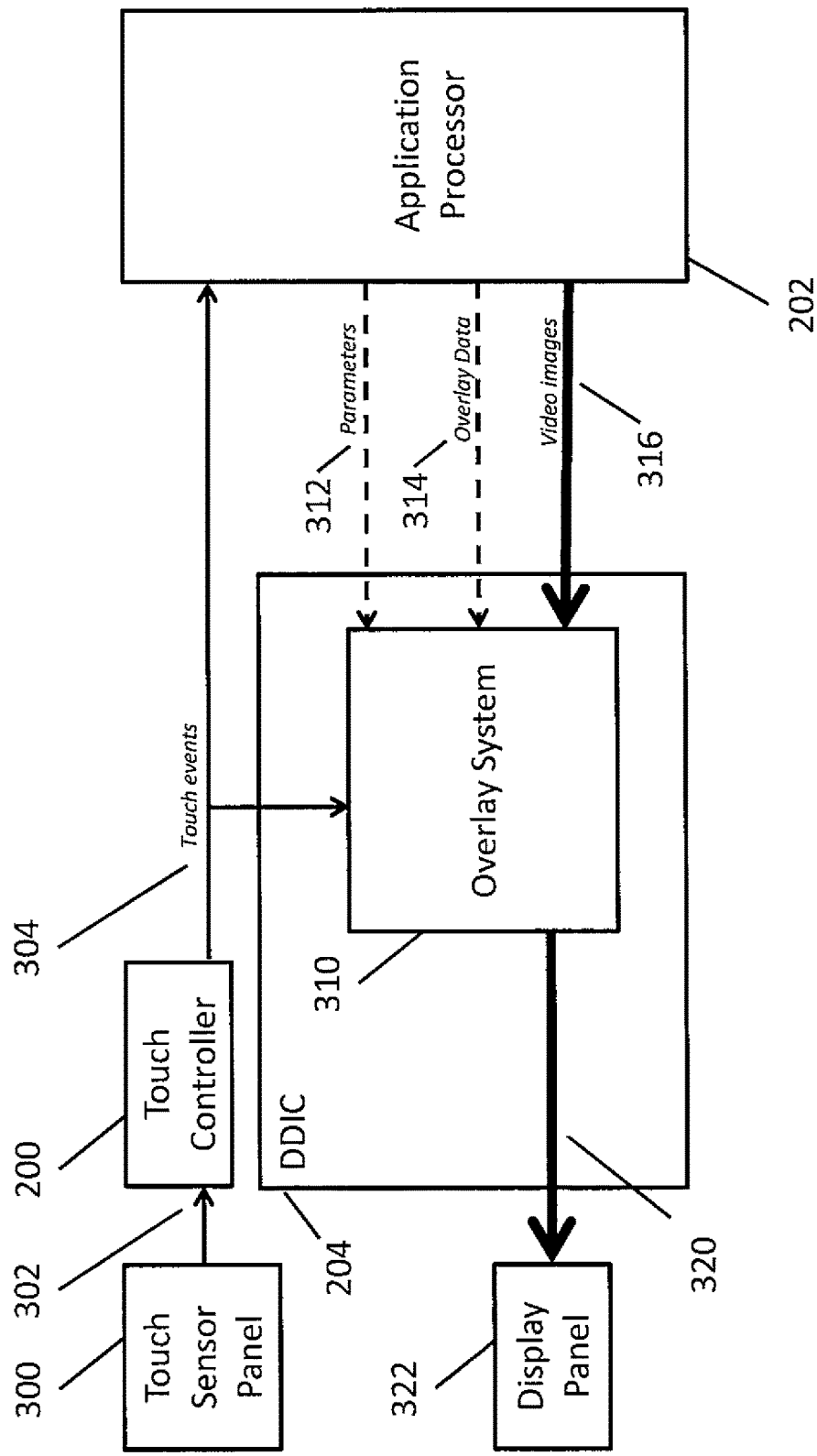
FIG. 3 is a block diagram illustrating a device including a low latency overlay system according to one embodiment of the present invention.

Referring to FIG. 3, typically a touch screen system and display system operate independently.

Referring to FIG. 3, a touch sensor panel 300 is configured to detect a user's touches and generates touch signals 302 which are supplied to a touch controller 200 over a data bus. The touch controller 200 processes the touch signals 302 from the touch sensor panel 300 and outputs touch events 304, such as coordinates of the touch locations, to the AP 202. Embodiments of the invention can be used with touch sensor panels 300 that detect a user's touch using any type of pointing implement, such as a body part (e.g., a finger), a stylus, etc. As used herein, the term "pointing implement" refers to objects that can be detected by a touch sensor panel 300, including devices (such as an active stylus and a passive stylus) and body parts (such as a finger or a hand). Embodiments of the present invention can be used with any of a variety of types of touch input panels such as resistive touch panels, surface acoustic wave touch panels, capacitive touch panels, infrared touch panels, and optical touch panels. In one embodiment, touch signals 302 correspond to the raw data supplied by the touch sensor panel 300, such as measurements of capacitance or voltage or current for each location in the touch sensor panel. The data bus for the touch events 304 is connected to both the AP 202 and the low-latency overlay system 310. The touch events 304 may be a stream of data values corresponding to locations at which touches by a user were detected (e.g., changes of capacitance or voltage or current of sufficiently high value to constitute the detection of a touch event). In some embodiments, the touch events 304 include pressure data indicating the pressure that was applied to the touch sensor panel.

The AP 202 processes the touch events 304, and application software running from the AP updates the display composition accordingly, by rendering video images (or frames of video images) 316 to the DDIC 204 for displaying on a display panel 322. The AP 202 may include a central processing unit (CPU), a graphical processing unit (GPU), and memory.

The AP 202 is connected to a DDIC 204 which, in turn, is connected to the display panel 322. The DDIC 204 receives the video images 316 from the AP 202 and supplies pixel driving signals 320 to the display panel 322.

In one embodiment, the touch sensor panel 300, the touch controller 200, the DDIC 204, and the display panel 322 are all components of a display module, which may be separate from the AP 202. In another embodiment, the touch sensor panel 300, the touch controller 200, the DDIC 204, and the display panel 322, or combinations thereof, may reside in separate modules, or be combined with the application processor.

The DDIC 204 processes the video images (or frames of video images) 316 received from the AP 202, and outputs pixel driving signals 320 to the display panel.

The overlay system 310 may receive overlay information in the form of the parameters 312 and the overlay data 314 from the AP 202, or the parameters 312 and the overlay data 314 may be generated in situ without inputs from the AP 202 or the application software. The functions of the parameters 312 and the overlay data 314 will be described in more detail below.

According to embodiments of the present invention, the low-latency overlay system 310 processes touch events 304 with the video images 316 so that the display panel 322 can display the visual responses to the touch event faster than in comparable implementations. In contrast to the approximately 6 frames or more display lag in some comparable devices, embodiments of the present invention can reduce the lag to 1 to 2 frames.

Figure 4:
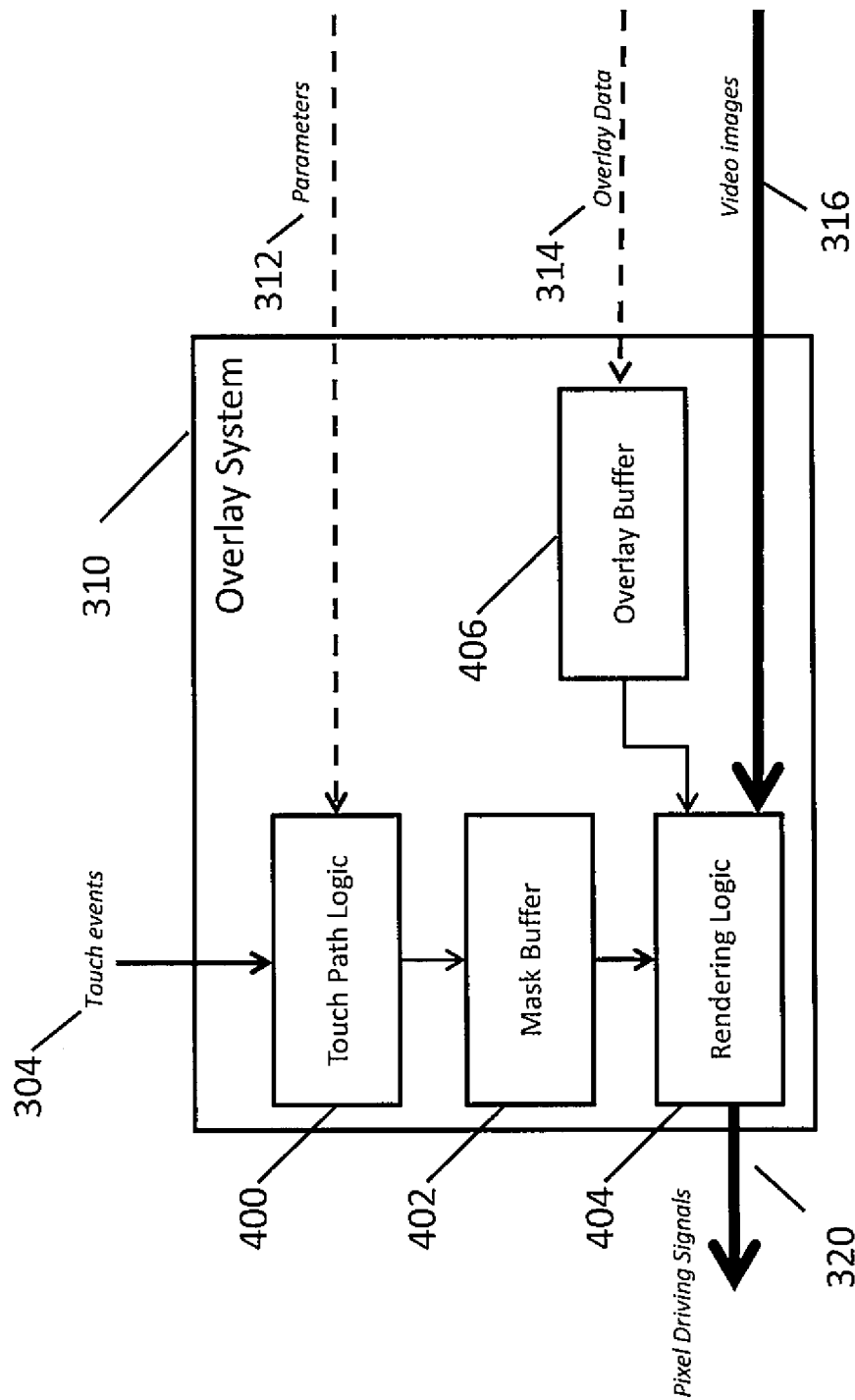
FIG. 4 is a block diagram illustrating components within a low latency overlay system according to one embodiment of the present invention.

In more detail, FIG. 4 is a block diagram illustrating a device including a low latency overlay system 310 according to one embodiment of the present invention. Referring to FIG. 4, embodiments of the present invention include four major parts: touch path logic 400, mask buffer 402, overlay buffer 406, and rendering logic 404. The overlay system 310 may be included as a component of a DDIC 204, or portions of the overlay system 310 may be included in a DDIC 204 or an AP 202 and other portions may be included in a touch controller 200.

Referring to FIG. 4, in one embodiment the touch path logic 400 is connected to the touch controller 200 and receives touch events 304 from the touch controller 200. The touch path logic 400 may also be connected to the AP 202 to receive configuration parameters 312. The touch path logic 400 is also connected to mask buffer 402, which is used by the rendering logic 404.

According to one embodiment, the overlay buffer 406 is a memory device within the DDIC 204 that is connected to the AP 202 and that stores overlay data 314 received from the AP 202. The overlay buffer 406 is configured to supply the stored overlay data 314 to the rendering logic 404. However, embodiments of the present invention are not limited thereto. For example, in one embodiment, the overlay data 314 may be created internal to the overlay system 310 without inputs from the AP 202. In yet another embodiment, the overlay data 314 may be a combination of data created internal to the overlay system 310 and data corresponding to the inputs from the AP 202.

According to one embodiment, the rendering logic 404 is coupled to the AP 202 and the overlay buffer 406 and is configured to combine the overlay data 314 with the video images 316 in accordance to the values in mask data 500 generated by the touch path logic 400 and stored within the mask buffer 402. The output of the rendering logic 404 is connected to the display panel 322 to supply the combined display images of the overlay data 314 and the video images 316 to the display panel 322 as pixel driving signals 320.

However, embodiments of the present invention are not limited thereto.

For example, in one embodiment, the touch path logic 400, mask buffer 402, overlay buffer 406, and rendering logic 404 are each implemented using different application specific integrated circuits (ASICs). In other embodiments of the present invention, a single ASIC is used to implement all functions. In still other embodiments of the present invention, a field programmable gate array (FPGA) is programmed to perform the functions of each of the touch path logic 400, the mask buffer 402, the overlay buffer 406, and the rendering logic 404. Alternatively, a general purpose processor may be programmed (e.g., with instructions stored in memory connected to the general purpose processor) to perform the functions of each of the touch path logic 400, the mask buffer 402, the overlay buffer 406, and the rendering logic 404. In still other embodiments, the functionality of one or more of the touch path logic 400, mask buffer 402, overlay buffer 406, and rendering logic 404 are implemented as components of the AP 202.

Furthermore, although the touch path logic 400, the mask buffer 402, the overlay buffer 406, and the rendering logic 404 are shown in FIG. 4 as being components of the DDIC 204, embodiments of the present invention are not limited thereto. In some embodiments, one or more of the touch path logic 400, the overlay buffer 406, the mask buffer 402, and the rendering logic 404 (or components capable of performing these functions) are located within, for example, the touch controller 200, AP 202, or as separate components. In addition, the components or the functions they perform may be located in different portions of the device. For example, the touch path logic 400 may be implemented as a component or a function of the touch controller 200 and both the overlay buffer 406, and the rendering logic 404 may be implemented as a component (or components) or a function (or functions) of the AP 202.

In addition, although the touch controller 200 is illustrated as a physically separate component, in some embodiments of the present invention the touch controller 200 is a portion of a larger integrated circuit. For example, the touch controller may be implemented in a same integrated circuit along with an AP and/or a DDIC.

Figure 5:
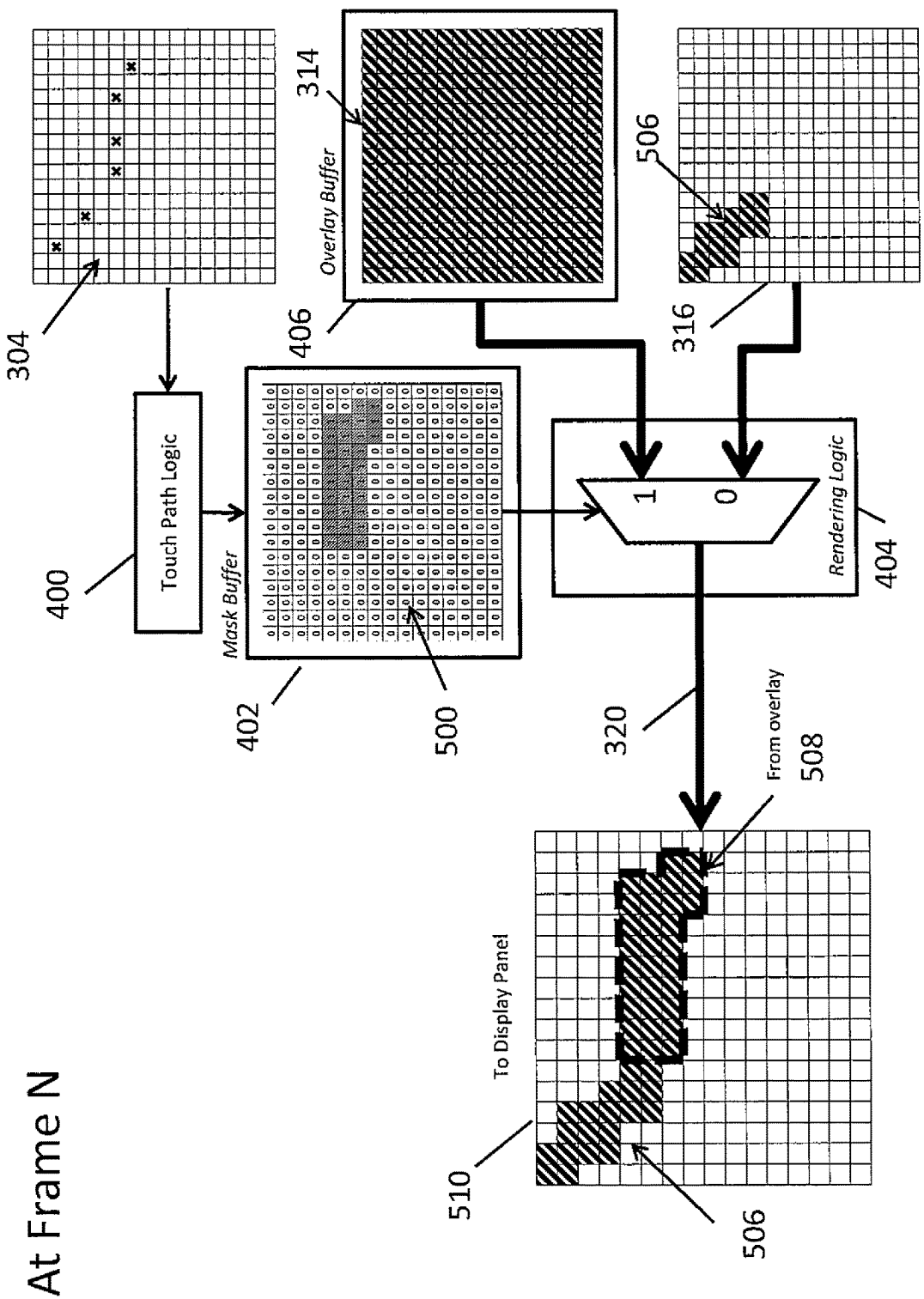
FIG. 5 is a schematic illustration of the combination of video image data, overlay data, and touch path information to generate a first combined display image, in accordance with one embodiment of the present invention.

FIG. 5 is a schematic illustration of the combination of video images 316 (or frames of video images), overlay data 314, and touch events 304 to generate a first set of combined display images 510 during an Nth frame (e.g., to generate Frame N), in accordance with one embodiment of the present invention. Referring to FIG. 5, the touch path logic 400 processes the touch events 304 from the touch controller and generates an estimated touch path by interpolating and/or extrapolating between the locations of a subset of the received touch events, for example a set of successive touch events, over a number of previous consecutive frames (e.g., the past X frames). The estimated touch path is then applied by the touch path logic 400 to generate mask data 500, which are stored within the mask buffer 402. The rendering logic 404 combines the overlay data 314 stored in the overlay buffer 406 with the video image for Frame N from the AP 202 in accordance with the mask data 500 to generate the combined display image 510 by selecting, at a pixel by pixel basis, between (or blending) the overlay data 314 and the video images 316.

According to one embodiment, the mask data 500 is a matrix of numerical values, wherein a position in the matrix corresponds to a position of a pixel (or pixels) in the display panel 322 and wherein the relative positions of the values in the matrix correspond to the relative positions of the pixels in the display panel 322 (e.g., the mask data 500 may be thought of as a two-dimensional matrix corresponding to a two-dimensional map of the pixel positions in the combined display image 510). According to one embodiment, each of the values of the mask data 500 is represented as a single bit, and the positions of the values in the mask data matrix correspond to positions in the combined display image. Positions where the overlay data are to be shown in the combined display image have the values set to a first value (e.g., "1") and positions where the overlay data are not to be shown (e.g., where the video image data is to be shown) have values set to a second, different value (e.g., "0").

According to other embodiments of the present invention, each of the numerical values in the mask data 500 is represented by multiple bits (e.g., 8-bits), where the numerical value of the mask data 500 refers to the degree of "transparency" of the overlay data at each location in the display. As used herein, the term "transparency" denotes a blending (e.g. merging) of the overlay data 314 and the video image 316 such that the combined display image 510 takes on characteristics of both the overlay data 314 and the video image 316.

Use of the mask buffer 402 by the rendering logic 404 will be described in more detail below.

In one embodiment, for each video frame, the touch path logic 400 generates the estimated touch path based on a subset of the touch events corresponding to a fixed number of video frames.

In another embodiment, the number of video frames is configurable to be in line with the display lag from AP 202.

In another embodiment, the touch path logic 400 generates a touch path for a variable number of video frames. The number of video frames can be determined from an external logic based on the past video images 316 from the AP 202.

A set of parameters 312 governs the characteristics of the estimated touch path when the path is generated. The parameters can have a start-up default, but may be adjusted as needed during run-time by software or other means. These parameters include, but are not limited to: width of path generated; style of line segments generated, such as simple straight segments or curves; region of the display wherein the path is allowed (e.g., the active drawing area); and the style of the rendering operation (e.g., antialiasing operations, smoothing operations, and transparency).

For example, when embodiments of the present invention are used in the context of a software application for drawing (e.g., a digital sketchbook), the overlay image segment 508 (which may also be referred to as computed portion 104), which is a portion of the combined display image 510, is only applied to portions of the display corresponding to the active drawing area. The overlay system 310 generally does not apply overlay data over portions of the display outside of the active drawing area. As such, parameters 312 can be set to restrict the estimated touch path to the portion of the display corresponding to the active drawing area (e.g., by defining boundaries of the active drawing area). In another example, the parameters 312 can contain the line width of the drawn line. The touch path logic 400 may use this parameter to render the shape of the line in the mask data 500 ahead of the AP-generated line (or image segment) 506 from the AP 202. (The image segment 506 may also be referred to as the displayed line 100.) The pressure data from the touch events 304 may also be used to render the shape of the line in the mask data 500 ahead of the AP-generated line (or image segment) 506.

As each pixel of the video image 316 is processed by the rendering logic 404, the rendering logic 404 retrieves a value in the mask data 500 wherein the position of the value in the mask data (e.g. the position in a matrix) corresponds to the location of the pixel in the video image 316, and performs a substitution of the pixel of the video image 316 with the overlay data 314 or a blending of the pixel of the video image 316 and the overlay data 314 in accordance with the value in the mask data 500 to achieve desired visual effects (e.g. transparency and/or anti-aliasing), and outputs either the overlay data 314 or the pixel of video image 316, or a blending thereof, to the display panel 322 via the pixel driving signal 320.

For example, in the substitution embodiment of this invention, the rendering operation of the rendering logic 404 can be specified using a single bit as defined by the values in the mask data 500. The rendering operation selects the output of the rendering logic to be either the video image 316 or the overlay data 314 for each pixel based on the value at the position in the mask data 500 corresponding to the position of the pixel in the combined display image 510.

In one embodiment of the present invention, the number of values of (or size of) the mask data 500 equals to the number of pixels in one frame of the video images 316 which in turn equals to the number of pixels in the combined display image 510. Thus there is a one-to-one relationship between each value in the mask data 500 and each pixel of the video image 316. In other words, the substitution embodiment of the rendering logic 404 is performed by matching each value in the mask data 500 to a corresponding pixel in the video image 316 and outputting either the pixel of the video image 316 or the overlay data 314 to the display panel 322. For example, in one embodiment the rendering logic 404 iterates through each value of the mask data 500. If a value of 0 exists at a particular position in the mask data 500, then the rendering logic 404 outputs the corresponding pixel of the video image 316. On the other hand, if a value of 1 exists at a particular position in the mask data 500, then the rendering logic outputs the overlay data 314. As a result of the iterative process, the rendering logic 404 outputs a combined display image 510, as represented in the pixel driving signal 320 to the display panel 322.

In another embodiment of the present invention, the number of values in the mask data 500 may be less than the number of pixels in a frame of video images 316. Thus, each value in the mask data 500 may have a one-to-many relationship to the pixels of video images 316 such that a value in the mask data 500 corresponds to multiple pixels of a video image 316, thereby reducing the size of the mask data 500 and reducing the memory requirements of the mask buffer 402.

However, embodiments of the present invention are not limited thereto. In the blending embodiment of the present invention, the rendering operation of the rendering logic 404 can be specified using multiple bits as defined by the values in the mask data 500. For example, the values in the mask data 500 may identify the level of blending (e.g., the level of transparency) to be rendered by the rendering logic 404. In another example, if multiple rendering operations are supported by the rendering logic 404, one or more bits of the values in the mask data 500 can be used to define the desired rendering operation, while other bits can be used to adjust the specifications of those rendering operations. The rendering logic 404 can perform various rendering operations between the information carried in the video image 316 and the information carried in the overlay data 314, such as edge-enhance, dodge (lighten), burn (darken), etc. In other embodiments, the rendering operation may change the color or luminosity of portions of the video image 316, thereby generating a transparent coloring (or highlighter) effect or alpha compositing effect.

The rendering logic 404 receives two inputs, the first input contains the video images 316 from the AP 202, and the second input contains the overlay data 314 from the overlay buffer 406. The overlay buffer 406 stores the overlay data 314 to be processed by the rendering logic 404. The overlay data 314 can be provided by the AP 202 or created internally in the overlay system 310 wherein the characteristics of the overlay data 314 are determined by the desired output of the rendering logic 404. In One embodiment, the characteristics (e.g., the appearance) of the overlay data 314 are matched to the characteristics (e.g., the appearance) of the video image 316 along the displayed line 100 such that when rendered according to the mask data 500, the combined display image 510 contains a seamless transition between the image segment 506 and the overlay image segment 508. These characteristics may include a color. For example, if the application software draws a black line, then the overlay data 314 would be provided by the AP 202 or internally created by the overlay system 310 to contain the same black color (e.g., a bitmapped image where all the pixels are black) as the software-drawn line. The rendering logic 404 would output a combined display image 510 that contains a black line formed by adjoining the image segment 506 (e.g. the software-drawn black line) from the AP 202 and the overlay image segment 508 as determined by the mask data 500 and the overlay data 314. The overlay data 314 can also be textured or colored or may include bitmapped image data. Content of overlay data 314 can be dynamic over time and can be updated by the AP 202, or updated by a mechanism within the DDIC 204. The content can also be dynamic in size and shape.

In one embodiment of the present invention, multiple different sets of overlay data 314 representing multiple overlays can be stored in the overlay buffer 406, e.g., each set having a different color, different image, or different texture. These sets of the overlay data 314 may be referred to herein as "pages." In such embodiments, the values in the mask data 500 may also include information to allow the rendering logic 404 to identify the specific page(s) of the overlay data 314 and to only use the identified page(s) during a rendering operation. As such, in some embodiments, the values of mask data 500 contain indices to the pages of the overlay data 314 to allow the rendering logic 404 to switch among the different pages of the overlay data 314 during rendering operations.

In one embodiment of the present invention, the number of values of (or size of) each page of the overlay data 314 equals to the number of pixels in one frame of the video images 316 which in turn equals to the number of pixels in the combined display image 510. Thus there is a one-to-one relationship between each value of each page of the overlay data 314 and each pixel of the video image 316.

In another embodiment of the present invention, the number of values of (or size of) each page of the overlay data 314 may be less than the number of pixels in a frame of video images 316. Thus, each value of each page of the overlay data 314 may have a one-to-many relationship to the pixels of video images 316 such that a value of each page of the overlay data 314 corresponds to multiple pixels of a video image 316, thereby reducing the size of the overlay data 314 and reducing the memory requirements of the overlay buffer 406. For example, in some embodiments, the overlay data 314 contains a single color value such as an RGB (red green blue) color value where the entire overlay image (or overlay image segment) 508 is drawn as that single color value. In other embodiments, the different pages of the overlay data 314 are single values corresponding to single colors (e.g., different colors). In still other embodiments, single values may be intermingled with other pages that contain bitmapped images or other values within the overlay data 314.

Figure 6:
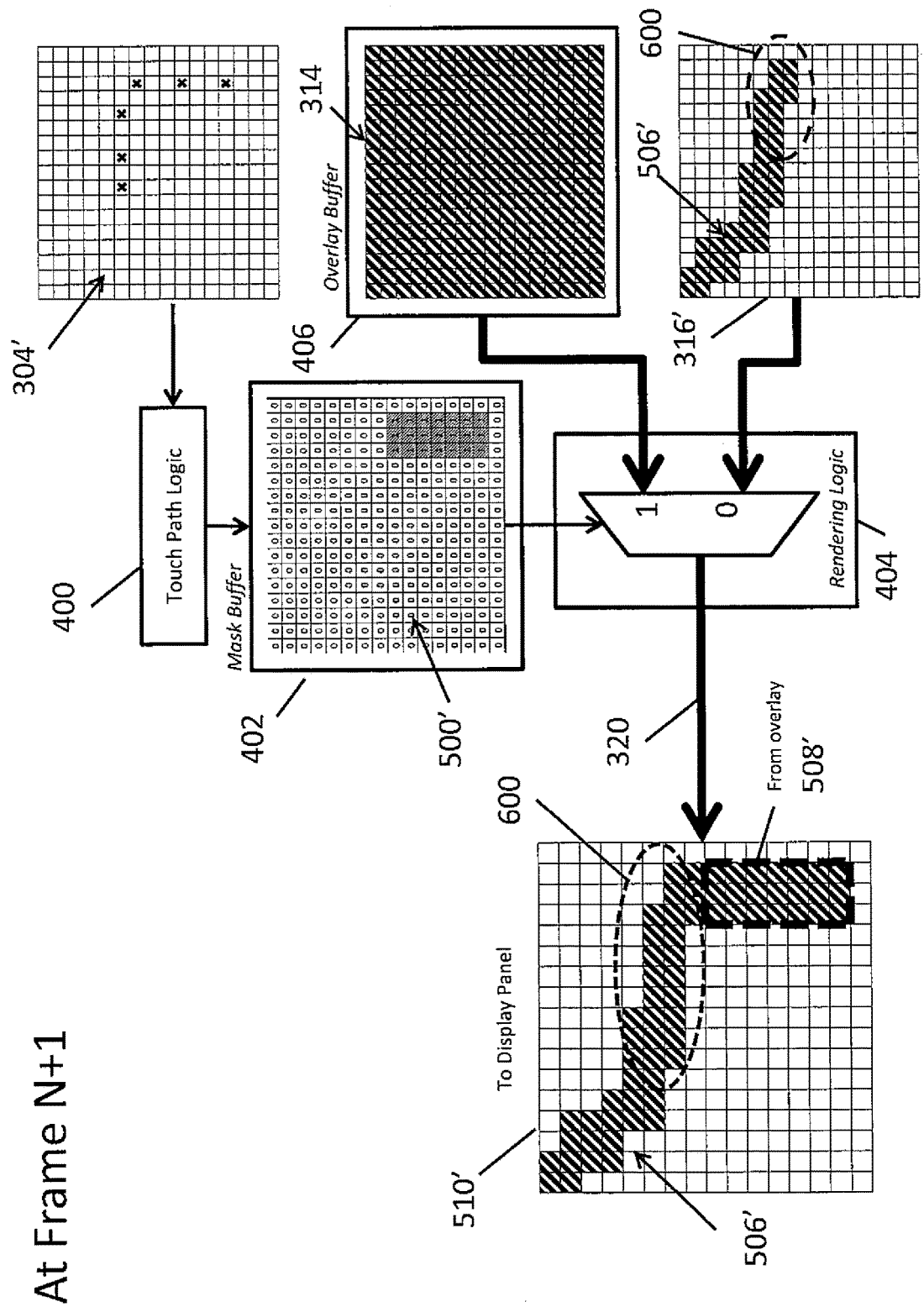
FIG. 6 is a schematic illustration of the combination of video image data, overlay data, and touch path information to generate a second combined display image, in accordance with one embodiment of the present invention.

FIG. 6 is a schematic illustration of the combination of video image 316', overlay data 314, and touch path 304' to generate a second set of combined display images 510' during an N+1th frame (e.g., to generate Frame N+1), in accordance with one embodiment of the present invention. In a subsequent frame (e.g., at frame N+1, where N is the frame corresponding to the first set of combined display images 510), the video image 316' from the AP 202 includes image segment 600 that was not displayed in frame N (e.g., not in video image 316 as shown in FIG. 5). In addition, during frame N+1, the touch path logic 400 has calculated from the touch events 304' a different mask 500' that contains a different set of values from those of the mask 500 shown in FIG. 5. As such, the rendering logic 404 outputs a combined display image 506' that is a composition of the video image 316' from the AP 202 and the overlay data 314 according to the mask data 500'.

Figure 7:
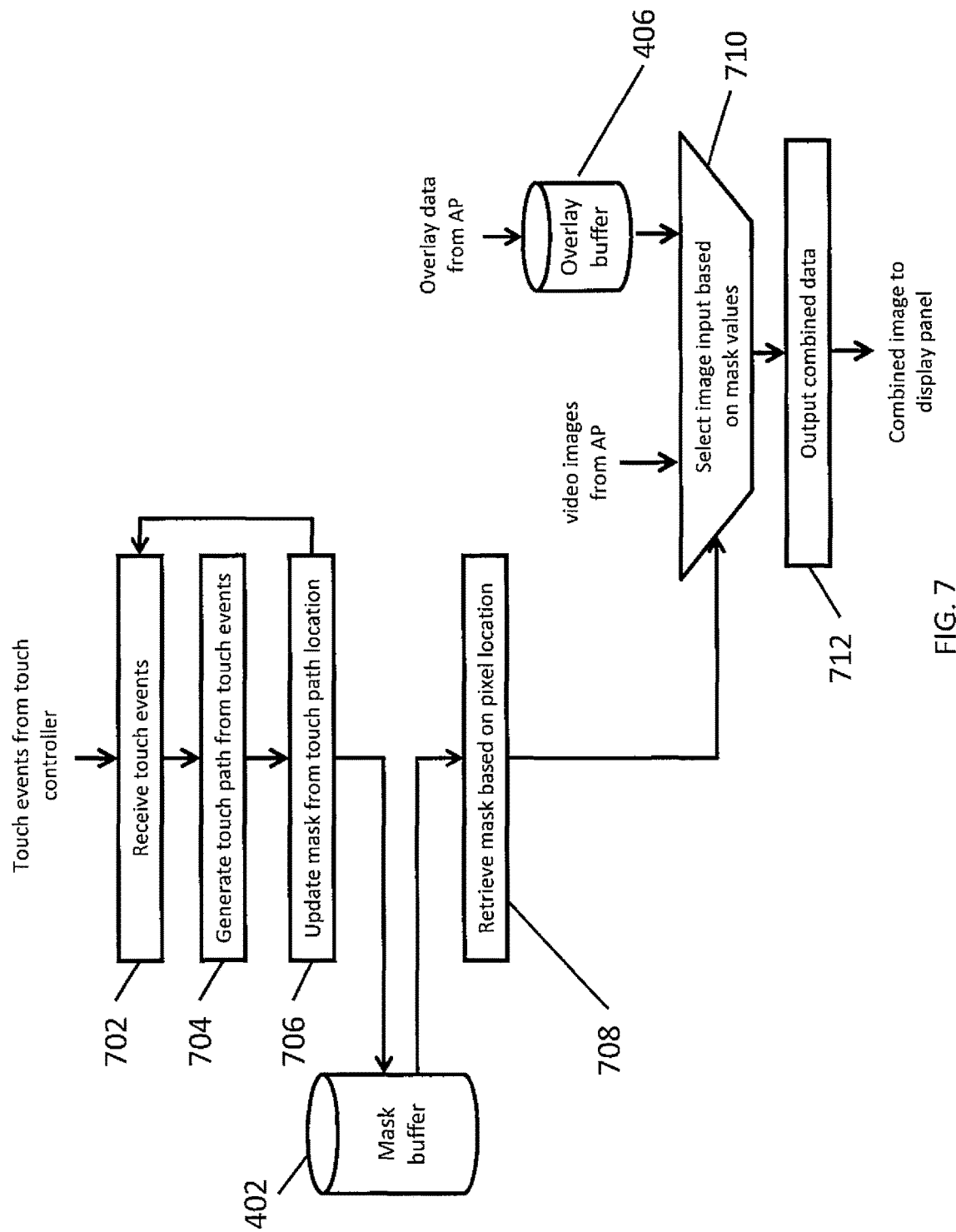
FIG. 7 is a flowchart illustrating a method for determining the application of the overlay data and combining the overlay data with video images in accordance with one embodiment of the present invention.

FIG. 7 is a flowchart illustrating a method for combining the overlay data with the video image to generate a combined display image in accordance with one embodiment of the present invention. Referring to FIG. 7, according to one embodiment of the present invention, in operation 702, touch events are received from an outside source (e.g., a touch sensor panel). A touch path (or estimated touch path) is generated from the touch events in operation 704 by interpolating or extrapolating between the touch events, where the interpolation method may be adjusted by parameters to configure, for example, width, style, straight or curved, region, and color of the overlay image segment 508 of the combined display image.

A mask data 500 is generated from the touch path in operation 706, where the relative positions of the values of the mask data 500 correspond to the relative positions of pixels of the display panel, and where the values of the mask data 500 indicate whether the corresponding pixel of the combined display image should contain either overlay data from the overlay buffer 406 or video image from AP, or a blended combination thereof. The mask data 500 is stored in a mask buffer 402. In operation 708, the mask data 500 is retrieved from the mask buffer 402, wherein the values retrieved are located in positions within the mask data 500 that correspond to the positions of the pixels currently being processed by the rendering logic.

In operation 710, the values of the mask data 500 corresponding to the positions of the currently-being-processed pixels in the display panel is used to selectively output either the overlay data from the overlay buffer 406 or the video image from the AP, or a blending thereof.

In operation 712, the combined display images are output and supplied to the display panel to display the overlay data 314 in composition with the video image.

As such, embodiments of the present invention provide a system and method for reducing overall system latency by introducing a low-latency loop inside the comparable high-latency loop.

Low-latency display images can be generated by combining information from mask data 500 generated from a touch path, overlay data 314 from an overlay buffer, and the high-latency video image from the AP. The touch path is calculated from touch events (e.g. outputs from the touch controller) recorded over time. The overlay data 314 can be provided by the AP or generated in the overlay system.

The overlay characteristics can be dynamically adjusted, including but not limited to color, dimensions (e.g., width), persistence, shading, and timing. These adjustments may be provided by the AP as a set of parameters or may be derived inside the overlay system, for example, by analyzing the video images from the AP). The adjustments can also be determined by touch behavior. For example, the width of the resulting line can be adjusted in accordance with the pressure applied to the touch sensor panel (e.g., the width parameter is proportional to the measured pressure of the touch events).

The display image is generated by the overlay system via the mask data 500, which is calculated from the touch path. The mapping and scaling parameters may be provided by the AP or may be calculated inside the overlay system by, for example, analyzing the touch events or the video images from the AP.

The overlay data can be merged with the video images from the AP at the pixel level by the rendering logic. In one embodiment, pixel characteristics from the video images are substituted with pixel characteristics from the overlay data in accordance with the values of the mask data. In other embodiments, new pixel characteristics are created based on a blending of the respective pixel characteristics from the video images and the overlay data.

Figure 8:
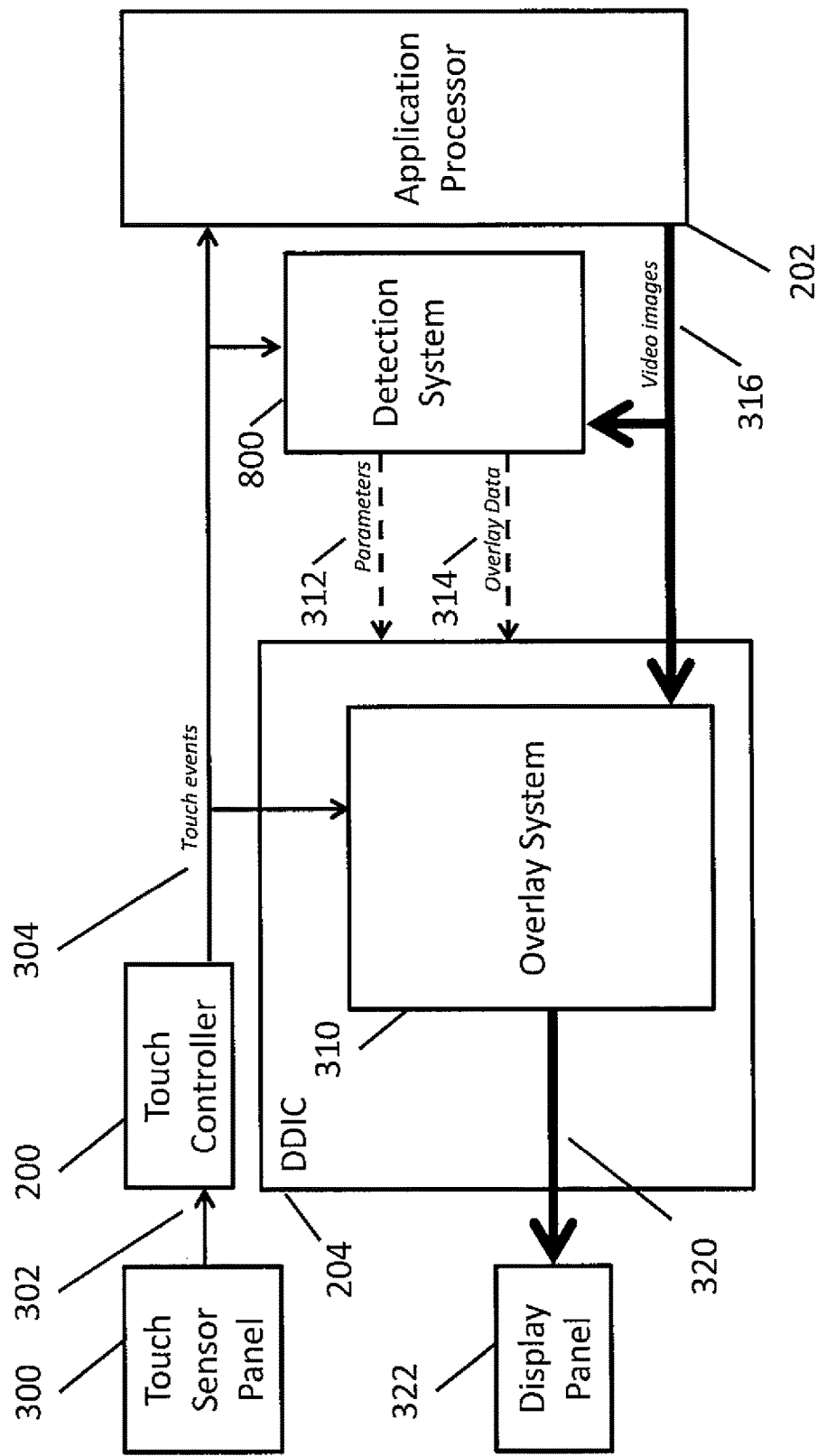
FIG. 8 is a block diagram illustrating a device including an overlay system and a detection system according to another embodiment of the present invention.

FIG. 8 is a block diagram illustrating a device including an overlay system and a detection system according to another embodiment of the present invention. The device of FIG. 8 differs from the device of FIGS. 2 and 3 in that the overlay system receives the parameters 312 and the overlay data 314 from a detection system 800 instead of the AP 202. In the embodiment illustrated in FIGS. 2 and 3, the overlay system 310 may be closely integrated with application software (e.g., in or running on the AP 202) so that the overlay system 310 can receive the parameters 312 and the overlay data 314. However, since the overlay system of FIG. 8 generates a display overlay without inputs from application software or the AP 202, there is no need for close integration between the overlay system 310 and the application software.

Such a configuration can be utilized where the current mobile device ecosystem does not support the overlay system. For example, where the application software is not aware of the overlay system, the software cannot enable or disable overlay functions or pass visual characteristics of the overlay data. Many software development kits do not contain definitions for "overlay data" and "parameters" and therefore cannot act upon application requests. The operating software of a mobile device also may not contain suitable device drivers to generate the "overlay data" and "parameters" and consequently cannot translate software development kit (SDK) service calls to hardware commands. Additionally, an application processor may not have physical outputs for "overlay data" and "parameters," and piggybacking "overlay data" and "parameters" onto the available display interfaces (such as Mobile Industry Processor Interface, a.k.a. MIPI) may not be supported by existing application processors. Embodiments of the present invention provide a device in which the overlay system does not receive data inputs from an application processor, an operating system, a software development kit, or application software. A device according to embodiments of the present invention thus includes a self-contained system that does not require any changes to the current mobile device ecosystem, thereby reducing integration efforts.

The detection system 800 of FIG. 8 provides two main functions: determining the visual characteristics of the overlay data 314, and facilitating the disabling of overlay if it crosses an active drawing boundary (e.g., to prevent the overlay from being applied outside of the active drawing area). The detection system 800 combines received touch events with received video images to generate the information to perform these two functions. Referring to FIG. 8, in one embodiment the detection system 800 receives the touch events 304 from the touch controller 200 and receives the video images 316 from the AP 202. The detection system 800 outputs the parameters 312 and the overlay data 314 to the overlay system 310. According to embodiments of the present invention, the detection system 800 can be part of the DDIC 204, or can be part of the AP 202, or a stand-alone component.

Figure 9:
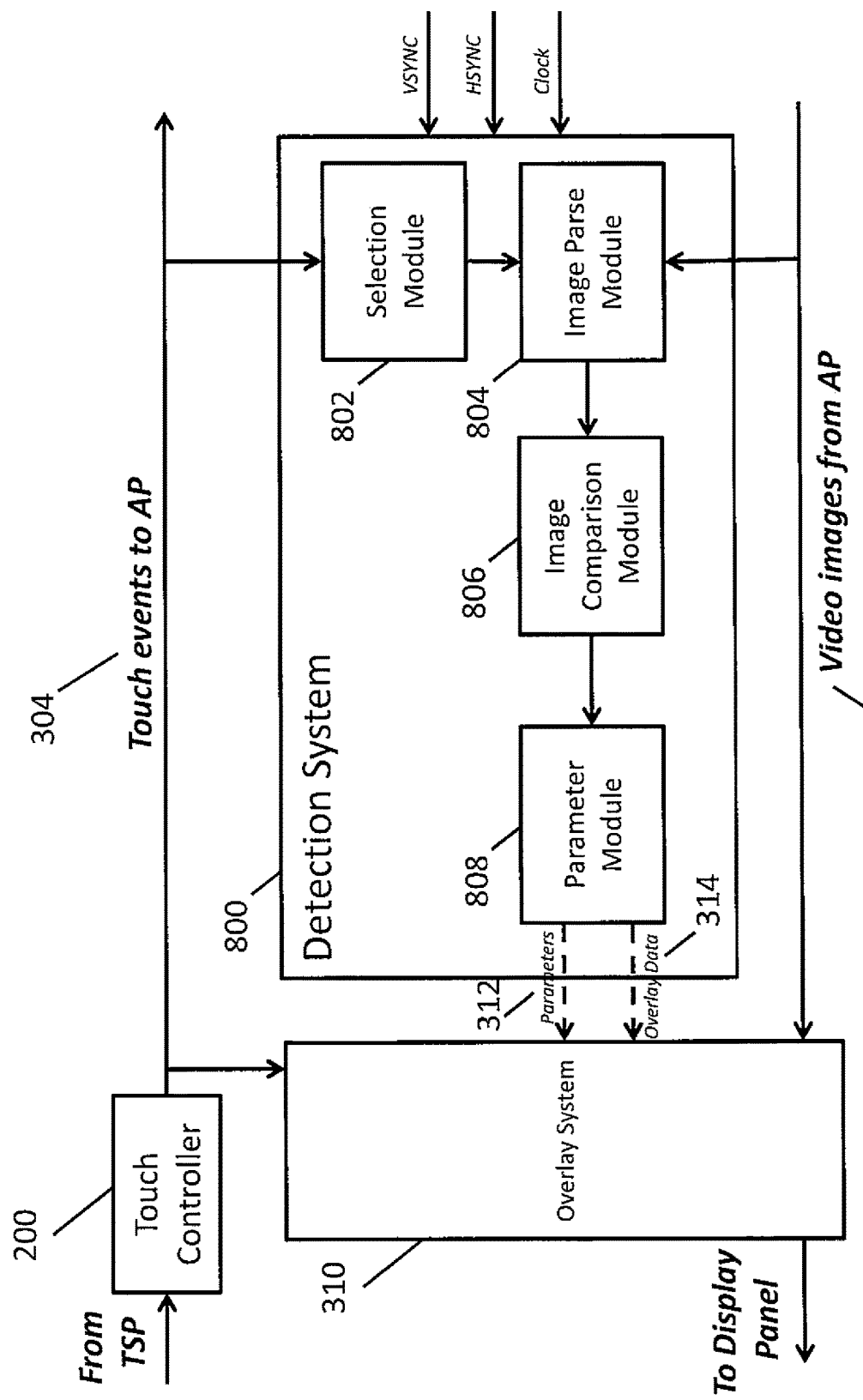
FIG. 9 is a block diagram illustrating components of a detection system according to one embodiment of the present invention.

In more detail, FIG. 9 is a block diagram illustrating components of a detection system according to one embodiment of the present invention. Referring to FIG. 9, a detection system 800 according to an embodiment includes a selection module 802, an image parse module 804, an image comparison module 806, and a parameter module 808. Reference timing signals VSYNC, HSYNC, and Clock from DDIC 204 are also applied to the detection system 800. According to an embodiment, the reference timing signals VSYNC, HSYNC, and Clock are applied to every module of the display device.

In one embodiment, the data bus for the touch events 304 is coupled to the AP 202, the overlay system 310, and the detection system 800. The selection module 802 receives the touch events 304 from the touch controller 200 and maps the locations of the touch events 304 to coordinates that correspond to the VSYNC and HSYNC reference timing signals. The selection module 802 outputs a set of mapped coordinates for each touch event location to the image parse module 804. The image parse module 804 receives the mapped coordinates from the selection module 802 and the video images 316 from the AP 202, and records sections of the video image 316 corresponding to each set of coordinates. The recorded sections are stored in memory for output to the image comparison module 806. The image comparison module 806 receives the recorded image sections and compares each individual image section to all the other image sections. For each image section, the image comparison module 806 outputs an estimated foreground color with a foreground uniformity factor, and an estimated background color with a background uniformity factor. The uniformity factors denote the percentage of an image section that contains the specified color. The parameter module 808 receives the estimated foreground and background colors and their respective uniformity factors from the image comparison module 806 and converts the information to overlay data for the overlay system 310. In one embodiment, when the device is in a handwriting mode, the parameter module 808 calculates the likelihood of visual characteristics of the line being drawn, and the likelihood that the overlay will cross boundaries of the active drawing area, and outputs parameters/data to the overlay system 310 accordingly.

In more detail, FIG. 10A is a flowchart illustrating a process of a selection module of a detection system according to one embodiment of the present invention. Referring to FIG. 10A, at block 1000, the selection module 802 receives touch events (e.g., from the touch controller 200) and interpolates between touch points at the received touch event locations to add interpolated touch points to reduce the distance (or maximum distance) between adjacent ones of the (received and interpolated) touch points. In FIG. 10B, the shaded areas 1001 of the illustrated grid represent touch event locations and the X symbols represent the interpolated touch points 1003. According to an embodiment, each square of the grid corresponds to a location (e.g., of a pixel) in the video image. At block 1002, the selection module 802 selects a section 1005 (e.g., a group of squares) around each touch point 1003. The interpolated touch points 1003 are thus used as references for selecting sections 1005 of the video image. In FIG. 10C, the shaded regions correspond to the selected sections 1005 to be mapped, and the selected sections 1005 are indexed (in the example shown in FIG. 10C, the seven selected sections 1005 are indexed using the numbers 1 to 7). Although in FIG. 10C each of the selected sections are shown as a three-pixel by three-pixel block having a square shape, embodiments of the present invention are not limited thereto, and the selected sections may have any shape and size. According to an embodiment, the default size of the selected section corresponds to the typical width of the drawn line. In one embodiment, the size of the selected section can be programmed (e.g., preprogrammed) into the detection module, or can be updated via register settings through firmware.

Referring to FIG. 10A, at block 1004, the selection module 802 maps coordinates of the selected sections 1005. In one embodiment, the coordinates correspond to corners or edges of the selected sections 1005. The mapped coordinates correspond to edges (or corners) of the sections selected at block 1002 and shown in FIG. 10C as the shaded regions 1005. FIG. 10D is a table of mapped coordinates corresponding to corners or edges of the selected sections 1005. According to an embodiment, each row and column of the illustrated grid is numbered. For each indexed section, the start row, stop row, start column, and stop column of the selected section are recorded in the coordinate table.

For example, the section 1005 indexed as section 1 has an upper edge corresponding to start row 2, a lower edge corresponding to stop row 4, a left edge corresponding to start column 2, and a right edge corresponding to stop column 4. Thus, the upper left corner of section 1 corresponds to start row 2 and start column 2, the lower left corner corresponds to stop row 4 and start column 2, the upper right corner corresponds to start row 2 and stop column 4, and the lower right corner corresponds to stop row 4 and stop column 4. However, embodiments of the present invention are not limited thereto, and coordinates corresponding to any boundary or portion of a selected section could be used.

Referring to FIG. 10A, at block 1006, the selection module 802 converts the mapped coordinates to display line timings in accordance with the reference timing signals VSYNC and HSYNC. According to an aspect of embodiments of the present invention, conversion to line timing is one way to synchronize the outputs of the selection module 802 with the timing of the display screen, in order to record the correct image sections in the image parse module 804. For example, when a display screen is refreshed in a raster-scan fashion, typically one line (or row) at a time from top left to bottom right, line timing controls the speed of the raster refresh. According to an embodiment, since the input of the selection module 802 is based on touch events that occur independently of the screen refresh, line timing conversion is a mechanism to synchronize the selection module's output to the display screen, and thus to the video image from the AP.

FIG. 10E is a table of the converted coordinates in line timing. In line timing, each row corresponds to a relative point in time, with the top row being earliest in time. For example, for the section that is earliest in time (e.g., the upper left-most section, indexed as section 1), the start column for rows 2 to 4 is column 2, and the stop column for rows 2 to 4 is column 4. However, embodiments of the present invention are not limited thereto, and various other coordinate systems could be utilized. For example, some displays (such as some field-sequential displays) do not refresh in a raster-scan fashion. Instead, a "field" (a section of the screen or the entire screen) is refreshed all at once. In such a case the conversion would be to the field timing instead of the line timing. The converted coordinates are output from the selection module 802 to the image parse module 804. Although not depicted in FIG. 10A, the reference timing signal Clock applies to all of blocks 1000, 1002, 1004, and 1006.

Figures 11A, 11B:
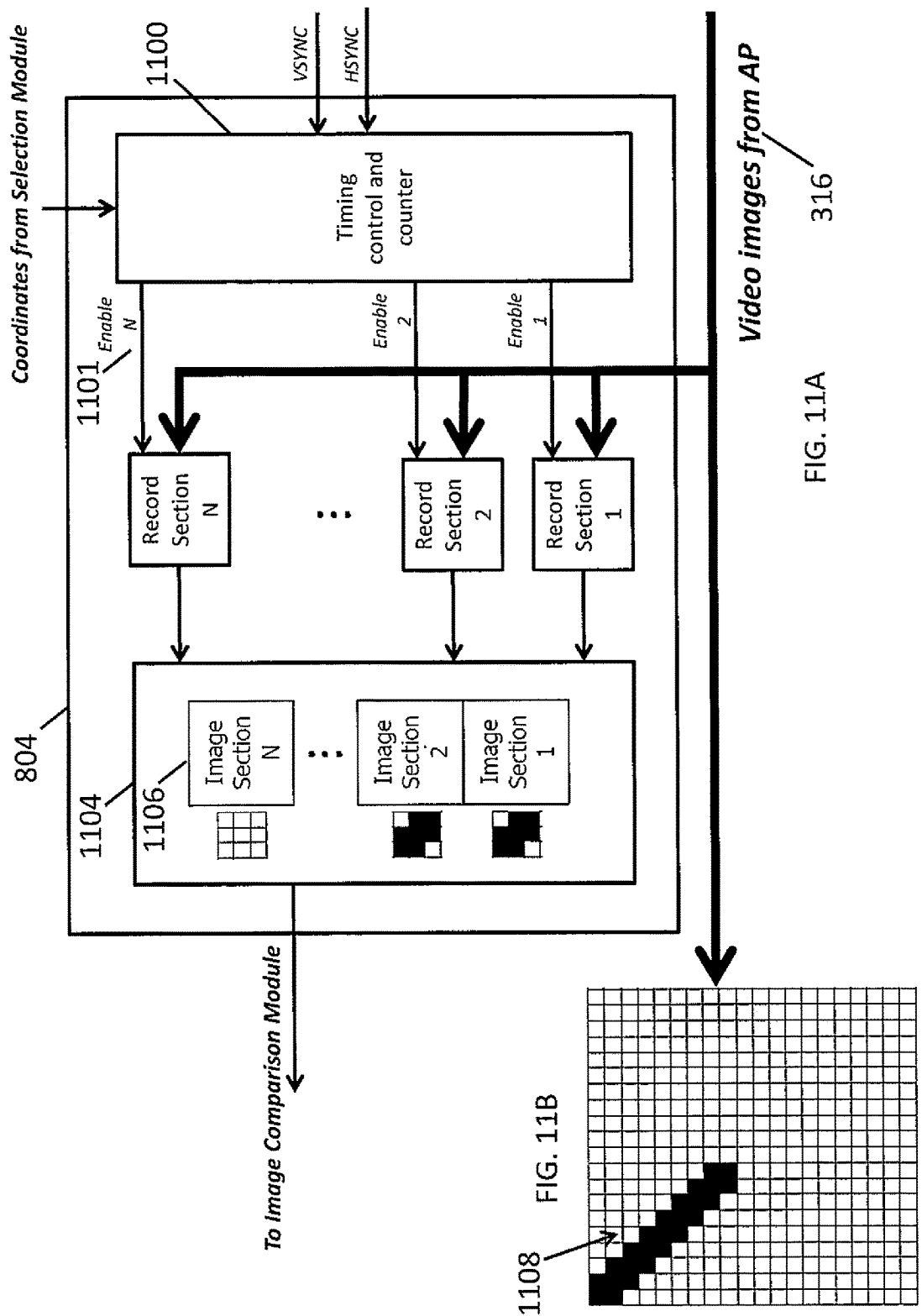
FIG. 11A is a block diagram illustrating an image parse module of a detection system according to one embodiment of the present invention.
FIG. 11B is a schematic illustration of a video image according to one embodiment of the present invention.

In more detail, FIG. 11A is a block diagram illustrating an image parse module 804 of a detection system 800 according to one embodiment of the present invention. Referring to FIG. 11A, the image parse module 804 receives the coordinates from the selection module 802 and the coordinates are input to a timing control and counter 1100 to which the reference timing signals VSYNC and HSYNC are applied. The image parse module 804 records sections of the video images 316 from the AP 202 corresponding to the coordinates from the selection module 802 (in other words, sections of the video corresponding to the selected sections 1005), in accordance with the timing control and counter 1100. The timing control and counter 1100 outputs enable signals (or start/stop signals) 1101 corresponding to each recorded image section so that recordation of individual sections can be started and stopped. According to an embodiment, when the display screen is refreshed in a raster-scan fashion, the video image arrives from the AP one pixel at a time from top left to bottom right. Since only a portion of each line is to be recorded, the enable signal starts and stops the recording. For example, referring to FIG. 10C, the image section 1 is a three-pixel by three-pixel block with its upper left corner at line (or row) 2 and column 2. When line timing reaches line (or row) 2 and column 2, the enable signal activates. When line timing reaches column 5 (still on line 2, the enable signal deactivates. On line (or row) 3, the same process occurs. The recorded sections of the video images are stored in memory 1104 as image sections 1106. Although FIG. 11A shows N Record Sections, in one embodiment the image parse module 804 includes just one recorder that cycles from 1 to N. The image parse module 804 is configured to output the stored image sections 1106 to the image comparison module 806 for further processing. Although the memory 1104 is shown in FIG. 11A as being within the image parse module 804, embodiments of the present invention are not limited thereto, and the memory 1104 may be located in any module of the device.

FIG. 11B is a schematic illustration of a video image according to one embodiment of the present invention. In a handwriting application, for example, there is typically a definitive background color and a definitive foreground color of sufficient contrast to the background color, and the active writing area consists almost entirely of these two colors. The background color may change, however, in areas outside of the active writing area. Referring to FIG. 11B, the lighter color is a background color of the video image and the black color is the foreground color of a line 1108 being drawn. According to an embodiment, the line 1108 shown in FIG. 11B is shorter than the actual path traced by the touch points (e.g., as shown in FIG. 10C) due to latency.

Figure 12:
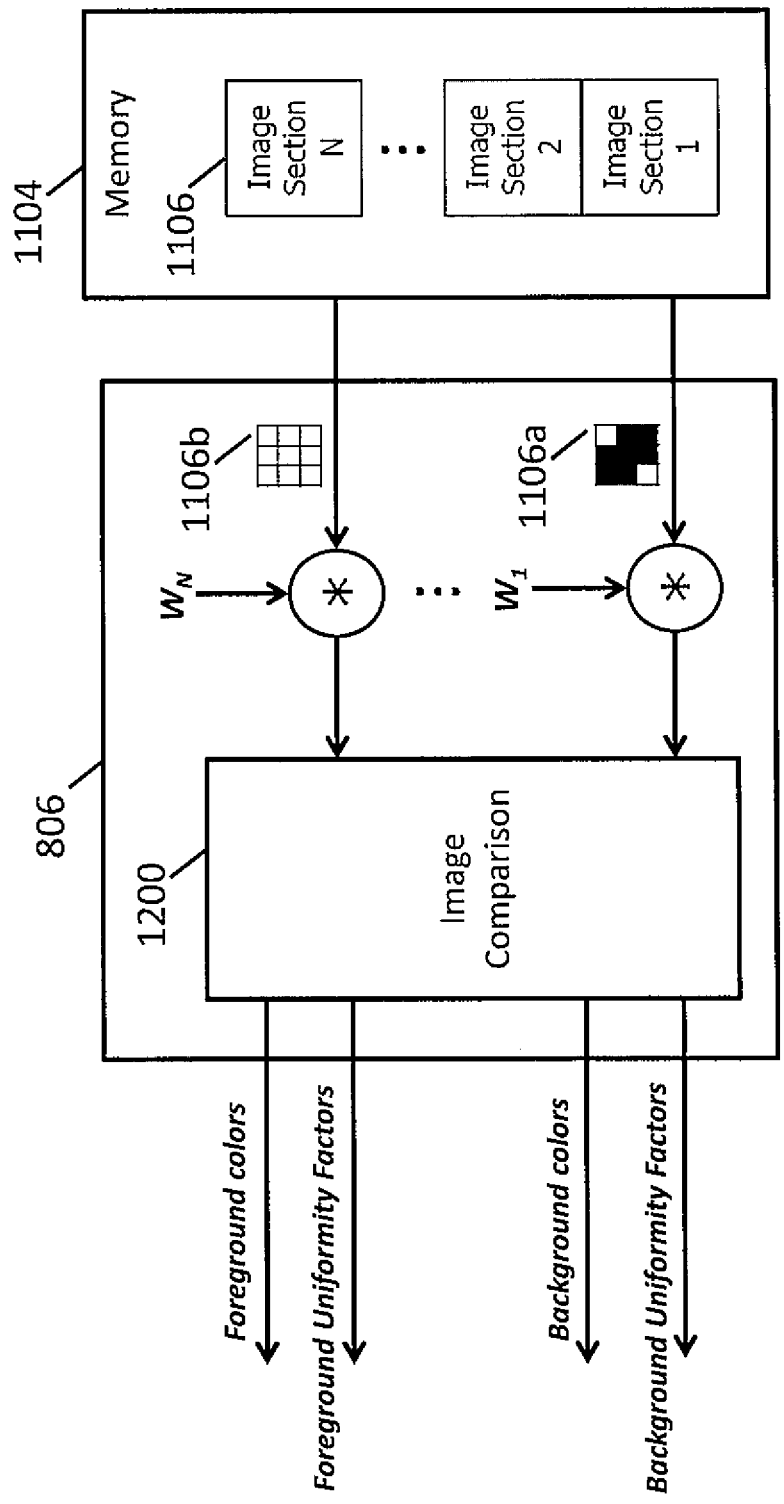
FIG. 12 is a block diagram illustrating an image comparison module of a detection system according to one embodiment of the present invention.

In more detail, FIG. 12 is a block diagram illustrating an image comparison module 806 of a detection system 800 according to one embodiment of the present invention. Referring to FIG. 12, the image comparison module 806 receives the image sections 1106 from the memory 1104 and analyzes each image section to detect and differentiate between foreground and background colors. The image comparison module 806 biases each image section toward containing more foreground color or more background color by applying a weighting factor $W_{1...N}$ to each image section. According to an embodiment, due to the latency in the display, for image sections that are earlier in time (e.g., lower-numbered image sections 1106), the image section is more likely to contain foreground color, and the weighting factor $W_{1...N}$ biases the image section toward containing more foreground color. For image sections that are later in time (e.g., higher-numbered image sections 1106), the image section is more likely to contain background color, and the weighting factor $W_{1...N}$ biases the image section toward containing more background color.

The image comparison unit 1200 receives the biased image sections and compares each individual image section to all other image sections to detect (or determine) the foreground colors and background colors of each section. The image comparison can be performed using any suitable algorithm for measuring color variances of multiple images and detecting the foreground and background colors of the images (e.g., a contrast-based image comparison). The image comparison unit 1200 also computes foreground uniformity factors and background uniformity factors for each image section. The uniformity factor denotes the percentage of an image section that contains the specified color. For example, after comparing the image section 1106a in FIG. 12 to all other recorded and stored image sections, the image comparison module 806 detects that the foreground color is black and the background color is white. Since 7 of the 9 squares in the image section 1106a contain the black foreground color, the foreground uniformity factor for the image section is calculated as approximately 78%. Since 2 of the 9 squares in the image section 1106a contain the white background color, the background uniformity factor for the image section is calculated as approximately 22%. Thus, for the image section 1106a, the image comparison unit 1200 outputs a foreground color of black, a foreground uniformity factor of 78%, a background color of white, and a background uniformity factor of 22%. For the recorded image section 1106b, the foreground uniformity factor is calculated as 0% and the background uniformity factor is calculated as 100%. Thus, for the image section 1106b, the image comparison unit 1200 outputs a foreground color of black, a foreground uniformity factor of 0%, a background color of white, and a background uniformity factor of 100%.

Figure 13A:
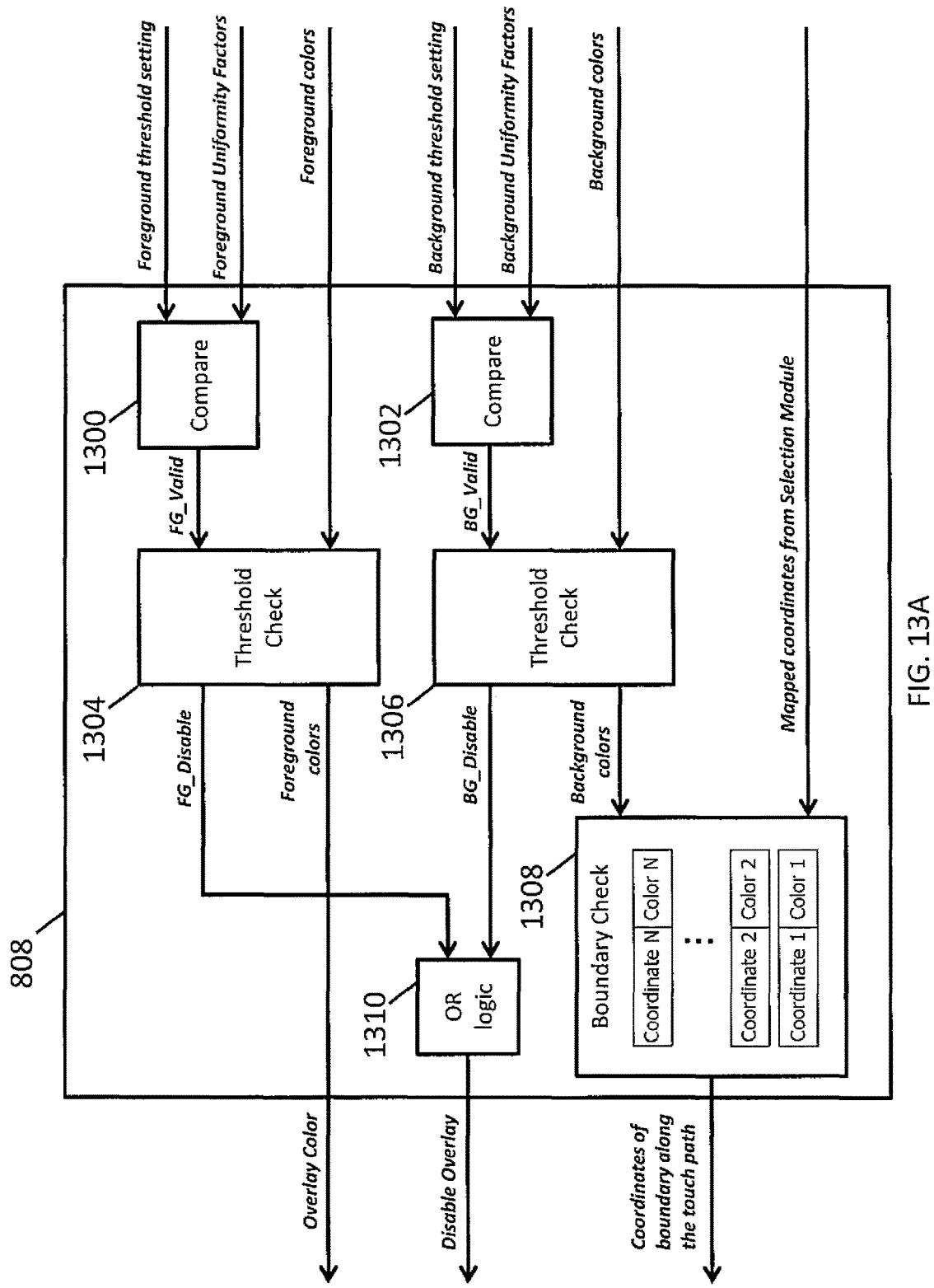
FIG. 13A is a block diagram illustrating a portion of a parameter module of a detection system according to one embodiment of the present invention.

In more detail, FIG. 13A is a block diagram illustrating a portion of a parameter module of a detection system according to one embodiment of the present invention. Referring to FIG. 13A, the parameter module 808 receives the foreground uniformity factors, foreground colors, background uniformity factors, and background colors for each image section from the image comparison module 806. The parameter module 808 also receives a foreground threshold value (or setting) and a background threshold value (or setting), which may be set by a designer of the system based on empirical data. The compare unit 1300 compares the foreground uniformity factor with the foreground threshold value, and if the foreground uniformity factor is greater than or equal to the foreground threshold value, outputs a signal FG_Valid at an active level.

According to an aspect of embodiments of the present invention, a foreground uniformity factor that is greater than or equal to the foreground threshold value indicates a greater likelihood or level of confidence that the image section in question truly contains the foreground color. A foreground uniformity factor that is not greater than or equal to a foreground threshold value indicates a lesser likelihood or level of confidence that the image section in question truly contains the foreground color. If the FG_Valid signal is at an active level, the threshold check unit 1304 passes the foreground color through and it is output from the parameter module 808 as the overlay color. If the FG_Valid signal is not at an active level, such as when the foreground uniformity factor is not greater than or equal to the foreground threshold value, there is a lesser level of confidence that the image section truly contains the foreground color. The threshold check unit 1304 therefore outputs an FG_Disable signal disabling the overlay to avoid displaying an incorrect overlay color.

For example, for the image section 1106a, the compare unit 1300 compares the foreground uniformity factor of 78% to a foreground threshold value, e.g., 60%. Since the foreground uniformity factor is greater than the foreground threshold value, the compare unit 1300 sets the FG_Valid signal at an active level, and the black foreground color of image section 1106a is output as the overlay color for that section. For the image section 1106b, the compare unit 1300 compares the foreground uniformity factor of 0% with the foreground threshold value of 60%. Since the foreground uniformity factor is not greater than or equal to the foreground threshold value, the compare unit 1300 does not set the FG_Valid signal at an active level. The threshold check unit 1304 thus outputs the FG_Disable signal to disable overlay.

The compare unit 1302 compares the background uniformity factor with the background threshold value, and if the background uniformity factor is greater than or equal to the background threshold value, outputs a signal BG_Valid at an active level. According to an aspect of embodiments of the present invention, a background uniformity factor that is greater than or equal to the background threshold value indicates a greater likelihood or level of confidence that the image section in question truly contains the background color. A background uniformity factor that is not greater than or equal to the background threshold value indicates a lesser likelihood or level of confidence that the image section in question truly contains the background color. If the BG_Valid signal is at an active level, the threshold check unit 1306 passes the background color through to the boundary check unit 1308. If the BG_Valid signal is not at an active level, such as when the background uniformity factor is not greater than or equal to the background threshold value, there is a lesser level of confidence that the image section truly contains the background color. The threshold check unit 1304 thus outputs a BG_Disable signal disabling overlay, to avoid displaying an incorrect overlay color.

For example, for the image section 1106a, the compare unit 1302 compares the background uniformity factor of 22% with a background threshold value, e.g., 60%. Since the background uniformity factor is not greater than or equal to the background threshold value, the compare unit 1302 does not set the BG_Valid signal at an active level. The threshold check unit 1306 thus outputs a BG_Disable signal to disable overlay. For the image section 1106b, the compare unit 1302 compares the background uniformity factor of 100% with the background threshold value of 60%. Since the background uniformity factor is greater than the background threshold value, the compare unit 1302 sets the BG_Valid signal at an active level and passes the white background color through to the boundary check unit 1308.

Referring to FIG. 13, the FG_Disable and BG_Disable signals are input to an OR logic unit 1310 so that if either the FG_Disable signal or the BG_Disable signal is output, overlay is disabled.

The boundary check unit 1308 receives the background colors from the threshold check unit 1306 and receives the mapped coordinates from the selection module 802. According to an embodiment, the boundary check unit 1308 is configured to prevent the overlay data from being applied over portions of the display outside of the active drawings area. In the boundary check unit 1308 of FIG. 13A, each set of mapped coordinates from the selection module 802 is associated with a corresponding background color. For example, for indexed image section 1, the coordinates for image section 1 (e.g., as shown in FIG. 10E) are associated with a white background color. The boundary check unit 1308 detects changes in background colors between image sections, and if there is a change, outputs the corresponding coordinates of the boundary along the touch path just prior to the color change.

According to an embodiment, a change in background color as a user's pointing implement moves across an active drawing area of a display indicates that the user has moved outside of the active drawing area. In one embodiment, if the boundary check unit 1308 detects a change from a white background color (e.g., the background color of the active drawing area) to a different background color, such as blue, the boundary check unit 1308 outputs the set of coordinates corresponding to the white background color just prior to the color change. If, for example, a first image section (e.g., the indexed image section 7) corresponded to the white background color and a second image section (e.g., the indexed image section 8) corresponded to the blue background color, the coordinates of the first image section (e.g., image section 7) would be output. In one embodiment, the overlay system 310 receives the boundary coordinates from the boundary check unit 1308 and prevents the overlay from being displayed outside the boundary. In the above example, the overlay system 310 would receive the coordinates of the image section 7 and prevent overlay from being applied beyond those coordinates.

Figure 13B:
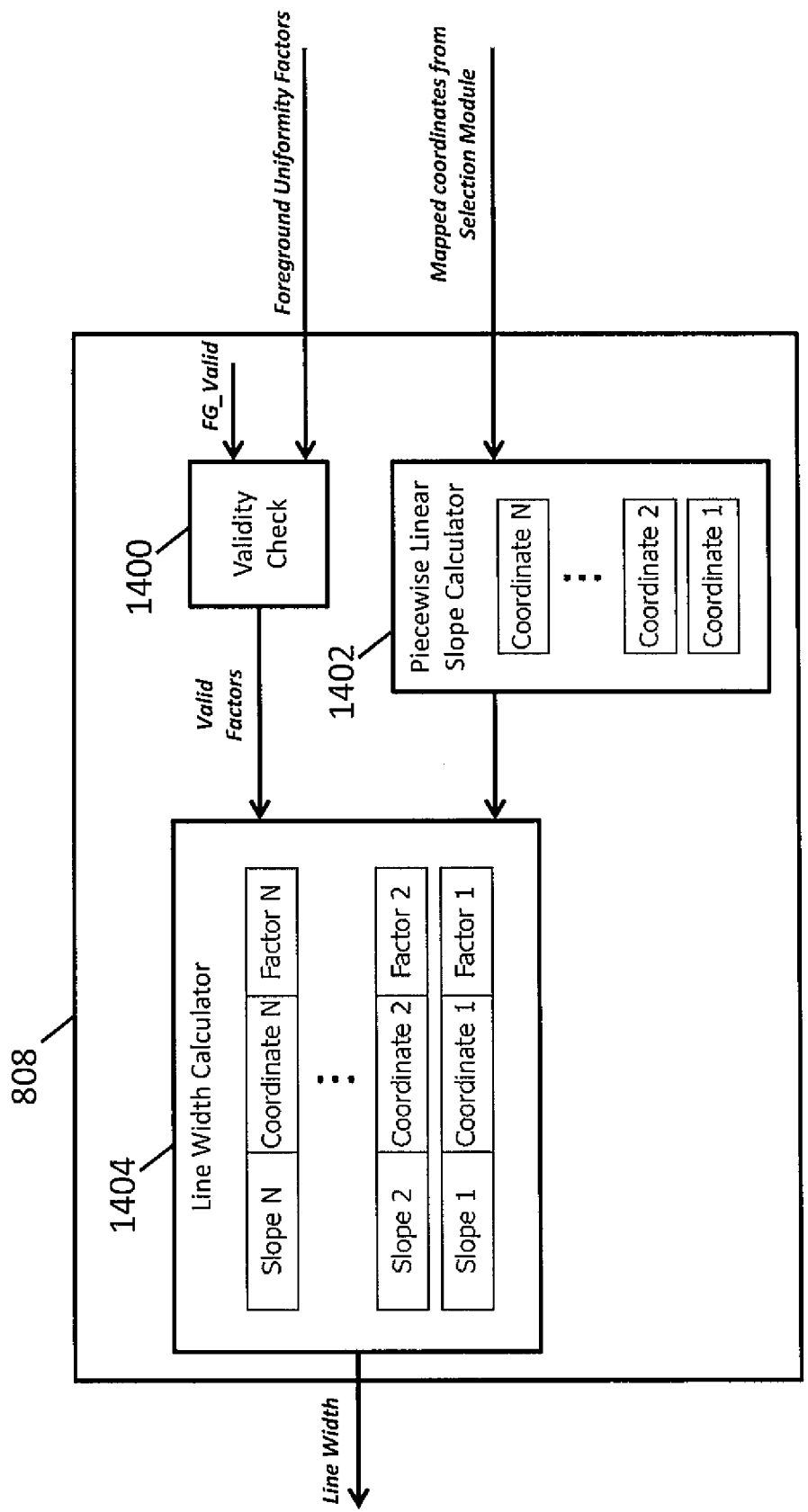
FIG. 13B is a block diagram illustrating another portion of a parameter module of a detection system according to one embodiment of the present invention.

In more detail, FIG. 13B is a block diagram illustrating another portion of a parameter module of a detection system according to one embodiment of the present invention. According to an embodiment, the portion of the parameter module 808 illustrated in FIG. 13B is configured to calculate the line width of the overlay. The foreground uniformity factors and the FG_Valid signal for each image section are input to a validity check unit 1400, which determines valid factors. According to an embodiment, the validity check unit 1400 passes only those foreground uniformity factors with a corresponding activated FG_Valid signal. That is, the validity check blocks any foreground uniformity factors that do not have a corresponding activated FG_Valid signal. The foreground uniformity factors are utilized to identify portions of the line being drawn. In one embodiment, if a foreground uniformity factor for an image section is 100%, that section corresponds to an interior portion of the line being drawn. If the foreground uniformity factor is less than 100%, that section corresponds to an edge portion of the line. If the foreground uniformity factor is 0%, that section does not correspond to any portion of the line. Image sections corresponding to interior portions and edge portions of a line can be utilized to calculate the line width. The mapped coordinates from the selection module 802 are input to a piecewise linear slope calculator 1402, which calculates the slope of the line within each set of coordinates. The line width calculator 1404 receives the valid factors from the validity check unit 1400 and the slope calculations from the piecewise linear slope calculator 1402 and associates each valid factor and calculated slope with a set of coordinates of an image section.

The parameter module 808 of FIGS. 13A and 13B is therefore configured to output the overlay color, boundary coordinates, line width, and disable parameters to the overlay system 310. Because the overlay data and parameters are generated in situ without utilizing the mobile device's application software, the latency of the display in response to a touch input may be reduced. Additionally, less memory may be utilized as only selected sections of the video image around the touch locations are stored.

However, embodiments of the present invention are not limited thereto.

For example, in one embodiment, the selection module 802, image parse module 804, image comparison module 806, and parameter module 808 are each implemented using different application specific integrated circuits (ASICs). In other embodiments of the present invention, a single ASIC is used to implement all functions. In still other embodiments of the present invention, a field programmable gate array (FPGA) is programmed to perform the functions of each of the selection module 802, image parse module 804, image comparison module 806, and parameter module 808. Alternatively, a general purpose processor may be programmed (e.g., with instructions stored in memory connected to the general purpose processor) to perform the functions of each of the selection module 802, image parse module 804, image comparison module 806, and parameter module 808.

Furthermore, although the selection module 802, image parse module 804, image comparison module 806, and parameter module 808 are shown in FIG. 9 as being components of the detection system 800, embodiments of the present invention are not limited thereto. In some embodiments, one or more of the selection module 802, image parse module 804, image comparison module 806, and parameter module 808 (or components capable of performing these functions) are located within, for example, the DDIC 204, the overlay system 310, or as separate components. In addition, the components or the functions they perform may be located in different portions of the device.

While the present invention has been described in connection with certain example embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A system comprising:

a processor; and a memory, wherein the memory stores instructions that, when executed by the processor, cause the processor to:
 receive touch inputs at touch input locations, and receive a video image;
 record image sections of the video image corresponding to the touch input locations;
 determine foreground color information and background color information of each image section, based on a comparison of the image sections of the video image;
 convert the foreground color information and the background color information to overlay information corresponding to a touch path along the touch input locations;
 retrieve, from a mask buffer, mask data corresponding to the touch inputs;
 retrieve the overlay information from an overlay buffer; and
 output, based on the mask data, the overlay information, and the video image, a combined display image that combines the video image and an overlay generated according to the overlay information, wherein the video image comprises a foreground color and a background color, the foreground color only represents a displayed line along the touch path,
 wherein a display driver interface controller is configured to receive the video image from an application processor, to receive the touch inputs directly from a touch controller, and to output the combined display image to a display panel.

2. The system of claim 1, wherein the foreground color information comprises a foreground color of the image section and a foreground uniformity factor that is a percentage of the image section containing the foreground color, and the background color information comprises a background color of the image section and a background uniformity factor that is a percentage of the image section containing the background color.

3. The system of claim 2, wherein the overlay information comprises a color of an overlay, and the instructions, when executed, further cause the processor to disable an overlay or to output the foreground color of the image section as the color of the overlay, based on a comparison of the foreground uniformity factor and a foreground threshold value.

4. The system of claim 2, wherein the instructions, when executed, further cause the processor to disable an overlay or to determine a boundary for the overlay, based on a comparison of the background uniformity factor and a background threshold value.

5. The system of claim 4, wherein the boundary for the overlay is determined by comparing the background color of a first image section and the background color of a second image section.

6. The system of claim 5, wherein the instructions, when executed, further cause the processor to output coordinates corresponding to the first image section when the background color of the first image section is different from the background color of the second image section.

7. The system of claim 2, the instructions, when executed, further cause the processor to determine a width of a line of the overlay based on the foreground uniformity factor.

8. The system of claim 1, wherein the instructions, when executed, further cause the processor to bias each image section toward containing more foreground color or more background color, by applying a weighting factor to each image section.

9. The system of claim 1,
wherein the application processor is configured to receive the touch inputs directly from the touch controller.

10. A method for generating a display overlay, the method comprising:
receiving, by a processor, a plurality of touch inputs at touch input locations, and a video image;
recording, by the processor, image sections of the video image corresponding to the touch input locations;
comparing, by the processor, the recorded image sections with one another to determine foreground color information and background color information of each image section;
converting, by the processor, the foreground color information and the background color information to overlay information corresponding to a touch path along the touch input locations;
retrieve, from a mask buffer, mask data corresponding to the touch inputs;
retrieve the overlay information from an overlay buffer; and
outputting, by the processor, based on the mask data, the overlay information, and the video image, a combined display image that combines the video image and an overlay generated according to the overlay information, wherein the video image comprises a foreground color and a background color, the foreground color only represents a displayed line along the touch path, and
wherein a display driver interface controller is configured to receive the video image from an application processor, to receive the touch inputs directly from a touch controller, and to output the combined display image to a display panel.

11. The method of claim 10, wherein the foreground color information comprises a foreground color of the image section and a foreground uniformity factor that is a percentage of the image section containing the foreground color, and the background color information comprises a background color of the image section and a background uniformity factor that is a percentage of the image section containing the background color.

12. The method of claim 11, wherein the overlay information comprises a color of the overlay, the method further comprising:
comparing, by the processor, the foreground uniformity factor and a foreground threshold value; and
disabling, by the processor, an overlay, or outputting, by the processor, the foreground color of the image section as the color of the overlay, based on the comparison.

13. The method of claim 11, further comprising:
comparing, by the processor, the background uniformity factor and a background threshold value; and
disabling, by the processor, an overlay, or determining, by the processor, a boundary for the overlay, based on the comparison.

14. The method of claim 13, wherein the determining the boundary for the overlay comprises comparing, by the processor, the background color of a first image section and the background color of a second image section.

15. The method of claim 14, further comprising:
outputting, by the processor, coordinates corresponding to the first image section when the background color of the first image section is different from the background color of the second image section.

16. The method of claim 11, further comprising:
determining, by the processor, a width of a line of the overlay based on the foreground uniformity factor.

17. The method of claim 10, further comprising:
applying, by the processor, a weighting factor to each image section to bias each image section toward containing more foreground color or more background color.

18. The method of claim 10, wherein an image section that is earlier in time is biased toward containing more foreground color and an image section that is later in time is biased toward containing more background color.

19. The method of claim 10,
wherein the application processor receives the touch inputs directly from the touch controller.

* * * * *